US005999657A

United States Patent [19]

Yasuhiko

[11] Patent Number: 5,999,657

[45] Date of Patent: Dec. 7, 1999

[54] RECORDING AND REPRODUCING APPARATUS FOR DIGITAL IMAGE INFORMATION

[75] Inventor: Teranishi Yasuhiko, Yokosuka, Japan

[73] Assignee: Victor Company of Japan, Ltd., Yokohama, Japan

[21] Appl. No.: 08/917,822

[22] Filed: Aug. 27, 1997

[30] Foreign Application Priority Data

Aug. 27, 1996 [JP] Japan .................................... 8-244084

[51] Int. Cl.[6] ........................................ G06K 9/36

[52] U.S. Cl. .......................... 382/248; 382/236; 382/245; 382/247; 382/277; 382/278; 382/285; 348/403; 348/404; 348/405; 348/420; 358/296; 358/261.1; 358/261.2

[58] Field of Search .................................... 382/248, 166, 382/232, 233, 234, 235, 236, 239, 250, 251, 253, 278, 276, 300, 285; 348/43, 154, 383, 403, 405, 407, 416; 358/296

[56] References Cited

U.S. PATENT DOCUMENTS

| | | | |
|---|---|---|---|
| 5,126,962 | 6/1992 | Chiang | 364/725 |
| 5,196,930 | 3/1993 | Kadono et al. | 358/133 |
| 5,268,755 | 12/1993 | Nishino et al. | 358/136 |
| 5,329,375 | 7/1994 | Juri et al. | 358/343 |
| 5,418,620 | 5/1995 | Nishino et al. | 358/335 |
| 5,499,144 | 3/1996 | Inoue et al. | 360/10.3 |
| 5,543,845 | 8/1996 | Asamura et al. | 348/407 |
| 5,559,931 | 9/1996 | Shindou et al. | 395/105 |
| 5,647,049 | 7/1997 | Odaka et al. | 386/124 |
| 5,767,898 | 6/1998 | Urano et al. | 348/43 |

*Primary Examiner*—Jose L. Couso
*Assistant Examiner*—Kanji Patel
*Attorney, Agent, or Firm*—Jacobson, Price, Holman & Stern, PLLC

[57] ABSTRACT

A recording and reproducing apparatus is disclosed. Each of main pixel blocks of (m pixels in a horizontal direction×m pixels in a vertical direction×n pixels in a time direction), m and n being an integer, included in a video signal is divided into a first and a second block. The horizontal pixel number of the first block is made half and the vertical pixel number of the second block is made half. Correlation between continuous two main pixel blocks is detected in the horizontal and vertical directions. Three-dimensional orthogonal transform is applied to either of the first or the second block according to the detected correlation. And, the video signal, the first or the second block thereof being applied with the three-dimensional orthogonal transform, is encoded to form a signal to be recorded. In reproduction, the formed signal is decoded. And, three-dimensional inverse-orthogonal transform which is inversion of the three-dimensional orthogonal transform is applied to the first or the second block to which the three-dimensional orthogonal transform is applied to compose the main blocks to reproduce the video signal.

7 Claims, 19 Drawing Sheets j→

| i ↓ | 0 | 1 | 2 | 3 | 4 |
|---|---|---|---|---|---|
| 0 | S0,0 | S0,1 | S0,2 | S0,3 | S0,4 |
| 1 | S1,0 | S1,1 | S1,2 | S1,3 | S1,4 |
| 2 | S2,0 | S2,1 | S2,2 | S2,3 | S2,4 |
| 3 | S3,0 | S3,1 | S3,2 | S3,3 | S3,4 |
| 4 | S4,0 | S4,1 | S4,2 | S4,3 | S4,4 |
| 5 | S5,0 | S5,1 | S5,2 | S5,3 | S5,4 |
| 6 | S6,0 | S6,1 | S6,2 | S6,3 | S6,4 |
| 7 | S7,0 | S7,1 | S7,2 | S7,3 | S7,4 |
| 8 | S8,0 | S8,1 | S8,2 | S8,3 | S8,4 |
| 9 | S9,0 | S9,1 | S9.2 | S9,3 | S9,4 |

|   | 0 | 1 | 2 | 3 | 4 |
|---|---|---|---|---|---|
| 0 | S0,0 | S0,1 | S0,2 | S0,3 | S0,4 |
| 1 | S1,0 | S1,1 | S1,2 | S1,3 | S1,4 |
| 2 | S2,0 | S2,1 | S2,2 | S2,3 | S2,4 |
| 3 | S3,0 | S3,1 | S3,2 | S3,3 | S3,4 |
| 4 | S4,0 | S4,1 | S4,2 | S4,3 | S4,4 |
| 5 | S5,0 | S5,1 | S5,2 | S5,3 | S5,4 |
| 6 | S6,0 | S6,1 | S6,2 | S6,3 | S6,4 |
| 7 | S7,0 | S7,1 | S7,2 | S7,3 | S7,4 |
| 8 | S8,0 | S8,1 | S8,2 | S8,3 | S8,4 |
| 9 | S9,0 | S9,1 | S9,2 | S9,3 | S9,4 |
| 10 | S10,0 | S10,1 | S10,2 | S10,3 | S10,4 |
| 11 | S11,0 | S11,1 | S11,2 | S11,3 | S11,4 |

j→, i↓

576 LINES, 720 PIXELS, SUPER BLOCK

SUPER BLOCK

27 MCRO BLOCKS

|  a1 |  a2 |  a3 |  a4 |
|---|---|---|---|
|  a5 |  a6 |  a7 |  a8 |
|  a9 | a10 | a11 | a12 |
| a13 | a14 | a15 | a16 |

|  b1 |  b2 |  b3 |  b4 |
|---|---|---|---|
|  b5 |  b6 |  b7 |  b8 |
|  b9 | b10 | b11 | b12 |
| b13 | b14 | b15 | b16 |

FIG.19A

| | | | | | | | |
|---|---|---|---|---|---|---|---|
| a1 | a2 | a3 | a4 | a5 | a6 | a7 | a8 |
| a9 | a10 | a11 | a12 | a13 | a14 | a15 | a16 |
| a17 | a18 | a19 | a20 | a21 | a22 | a23 | a24 |
| a25 | a26 | a27 | a28 | a29 | a30 | a31 | a32 |
| a33 | a34 | a35 | a36 | a37 | a38 | a39 | a40 |
| a41 | a42 | a43 | a44 | a45 | a46 | a47 | a48 |
| a49 | a50 | a51 | a52 | a53 | a54 | a55 | a56 |
| a57 | a58 | a59 | a60 | a61 | a62 | a63 | a64 |

FIG.19B

| | | | | | | | |
|---|---|---|---|---|---|---|---|
| a1 | a9 | a17 | a25 | a33 | a41 | a49 | a57 |
| a2 | a10 | a18 | a26 | a34 | a42 | a50 | a58 |
| a3 | a11 | a19 | a27 | a35 | a43 | a51 | a59 |
| a4 | a12 | a20 | a28 | a36 | a44 | a52 | a60 |
| a5 | a13 | a21 | a29 | a37 | a45 | a53 | a61 |
| a6 | a14 | a22 | a30 | a38 | a46 | a54 | a62 |
| a7 | a15 | a23 | a31 | a39 | a47 | a55 | a63 |
| a8 | a16 | a24 | a32 | a40 | a48 | a56 | a64 |

RECORDING AND REPRODUCING APPARATUS FOR DIGITAL IMAGE INFORMATION

BACKGROUND OF THE INVENTION

The present invention relates to a recording and reproducing apparatus for digital image information.

Digital image information has a huge amount of information. On the other hand, since communication capacity (memory capacity of a recording medium) of a transmission line used to transmit (record and reproduce) digital image information has a limitation, image information is compressed in the case where digital image information is transmitted (recorded and reproduced).

Representative examples of standards of the compression of image information include, for example, standards known as JPEG, MPEG 1, 2, and DVC standards known as standards of the compression of image information in digital VTR in which an interlaced scanning television signal is compressed, after which it is recorded.

Incidentally, the DVC standards are standards established as a result of discussion made in a "Discussion Meeting of HD Digital VCR" in which a number of VTR makers, research institutes and the like in many countries in the world are participated. In detail, the DVC standards are established with respect to the home digital VTR (VCR) in which a running magnetic tape is helically scanned by a rotary magnetic head, and digital data can be azimuth-recorded and reproduced on and from the magnetic tape.

In the DVC standards, the highly efficient image compression are carried out by various techniques such as discrete cosine transform (DCT), adaptive quantization, variable length coding and the like.

For example, with respect to the video signal of a so-called 525/60 system, suppose that the ratio of sampling frequency between a luminance signal Y, and chrominance signals Cb and Cr is 4:1:1. In this case, the number of effective pixels of the luminance signal in a horizontal direction is 720 and the number of effective lines in a vertical direction per frame is 480. Further, the number of effective pixels of the chrominance signals Cb and Cr in the horizontal direction is 180 and the number of effective lines in the vertical direction per frame is 480.

Further, with respect to the video signal of a so-called 625/50 system, suppose that the ratio of sampling frequency between a luminance signal Y, and chrominance signals Cb and Cr is 4:2:0. In this case, the number of effective pixels of the luminance signal in a horizontal direction is 720 and the number of effective lines in a vertical direction per frame is 576 and the number of effective pixels of the chrominance signals Cb and Cr is 360 and the number of effective lines in a vertical direction per frame is 288.

The effective pixel data in a moving picture signal to be recorded is divided per pixel block of a unit having a predetermined block size subjected to the orthogonal transform (the unit pixel block is a DCT block when the orthogonal transform is the discrete cosine transform). Each DCT block is subjected to the discrete cosine transform (DCT). The DCT block is constituted to have a block size of horizontal 8 pixels×vertical 8 pixels with respect to pixels within one frame for the luminance signal Y, and the chrominance signals Cb and Cr.

One frame for the moving picture signals to be recorded is divided per region (macro block) of a predetermined size in which one or more pixel blocks of the aforementioned unit are included.

The macro block is constituted as shown in FIG. 1A in the case where, with respect to the video signal of the so-called 525/60 system, the ratio of sampling frequency between a luminance signal Y, and chrominance signals Cb and Cr is 4:1:1. In detail, the macro block is composed of four DCT blocks DC0 to DC3 of the luminance signal, one DCT block DC4 of the chrominance signal Cb, and one DCT block DC5 of the chrominance signal Cr. These DCT blocks are obtained in the image region where one DCT block is obtained for the chrominance signal having a block size of horizontal 8 pixels×vertical 8 pixels.

Further, the macro block is composed as shown in FIG. 1B in the case where with respect to the video signal of the so-called 625/50 system, the ratio of sampling frequency between a luminance signal Y, and chrominance signals Cb and Cr is 4:2:0. In detail, the macro block is composed of four DCT blocks DC0 to DC3 by the luminance signal, one DCT block DC4 of the chrominance signal Cb and one DCT block DC5 of the chrominance signal Cr. These DCT blocks are also obtained in the image region where one DCT block of the chrominance signal having a block size of horizontal 8 pixels×vertical 8 pixels.

One image plane is divided by a super block composed of 27 macro blocks as a unit. In FIG. 2A, 50 divisions shown at (SO, 0), (SO, 1), (SO, 2) . . . , (S9, 2), (S9, 3), (S9, 4) are 50 super blocks composed in one frame. In FIGS. 2A and 2B, "i" designates the number of row and "j" designates the number of column. FIG. 2B shows the constitution of 5 super blocks (Si, j) set in one row per 27 macro blocks by taking any suitable one row in FIG. 2A.

FIGS. 3A and 3B show the super block for the 625/50 system. In FIG. 3A, 60 divisions shown at (SO, 0), (SO, 1), (SO, 2) . . . , (S11, 2), (S11, 3), (S11, 4) are 60 super blocks that constitute in one image plane. FIG. 3B shows a super block composed of 27 macro blocks.

In the DVC standards, one video segment is composed of 5 macro blocks which are obtained by, first, selecting one super block per column out of 10 super blocks belonging to each row in 50 super blocks (SO, 0), (30, 1), (S0, 2), . . . , (S9, 2), (S9, 3), (S9, 4) which constitute one image plane shown in FIG. 2A, and then taking out one macro block per super block selected as described above.

The control of data amount during the compression is carried out so that the data amount is within a predetermined amount in unit of one video segment.

Modes of DCT operation in the DVC standards include, with respect to the DCT block of horizontal 8 pixels×vertical 8 pixels, a mode for carrying out 8×8 DCT operation and another mode in which the 8×4 DCT operation is carried out with horizontal 8 pixels×vertical 4 pixels field by field, and the sum of and difference between the DCT coefficients are taken. The modes can be switched adaptively when coding.

The DCT coefficients obtained by the DCT operation are quantized with a quantization table that is selected so that the data amount after being applied with quantization and variable length coding is less than a predetermined value and closest to the predetermined value. In the quantization, the DCT blocks are divided into classes according to circumstances of the DCT blocks (such as a dispersion value of a pixel value in the DCT block), the quantization step is varied according to the classes to select one quantization table in macro block unit.

The data after variable length coding is subjected to formatting as shown in FIG. 4 when recorded on the magnetic tape. In FIG. 4, "QNO" indicates a quantization table number selected when compressed used as one of various parameters which is necessary when decoding together with data after variable length coding, "STA" information of error and concealment, "C" class information per DCT block and "M" mode information of the DCT operation.

All the information of one video segment are stored in 5 sync blocks. DC coefficients (DC components) of DCT coefficients in each of the DCT blocks DC0 to DC5 in the macro blocks shown in FIG. 1A are stored in a DC storage region in FIG. 4. Further, AC components of the DC coefficients are basically stored in an AC region in the same sync block as where the DC components are stored. However, in the case where the data amount is larger than the memory capacity of the storage region, they are stored in a vacant AC storage region in the sync block or another vacant AC storage region in the same video segment.

The formatted data are recorded in the magnetic tape in the form of a sync block constituted by adding parity words (inner parity) for SYNC word, ID code and error correction coding thereto, as shown in FIG. 5. Image data per frame is recorded by dividing it into 10 recording tracks. Image data per row shown in FIG. 2B is recorded in one recording track.

A track pair number indicating the sync block of which one of 10 recording tracks constituting image data per frame and a sync block number indicating which sync block in one recording track are recorded in the storage region of ID code in FIG. 5. Further, a sequence number (SEQ. No) in addition to these data is also stored in the ID code of the sync block in which image data is stored.

In the DVC standards, for the image signal according to the scanning standard of (2:1) interlaced scanning, highly-efficient coding is carried out only by intraframe coding. Further, since a motion vector is not used for highly-efficient compression, simple configurations can be achieved on a coding and a decoding apparatus, and editing operation can be easily carried out. Recently, there are manufactured VTRs for public use in which image data subjected to image information compression according to the DVC standards can be recorded and reproduced.

However, if there can be provided a recording and reproducing (transmission) apparatus capable of carrying out highly-efficient compression of image signal according to the scanning standard of sequential scanning of higher quality as compared with the image signal according to the scanning standard of (1:2) interlaced scanning as described above without addition of a considerable change in the constitution of apparatuses prepared in accordance with the DVC standards, such an apparatus can be effectively used for many applications and uses. Therefore, such an apparatus has been demanded.

SUMMARY OF THE INVENTION

A purpose of the invention is to provide a recording and reproducing apparatus capable of carrying out highly-efficient compression of image signal according to the scanning standard of sequential scanning of high quality.

The present invention provides a recording apparatus comprising: a divider to divide each of main pixel blocks of (m pixels in a horizontal direction×m pixels in a vertical direction×n pixels in a time direction) included in a video signal into a first block of (m/2 pixels in the horizontal direction×m pixels in the vertical direction×n pixels in the time direction) and a second block of (m pixels in the horizontal direction×m/2 pixels in the vertical direction×n pixels in the time direction), m and n being an integer; a detector to detect correlation between continuous two main pixel blocks in the horizontal and vertical directions; an orthogonal transformer to apply three-dimensional orthogonal transform to either of the first or the second block according to the detected correlation; and a coder to encode the video signal, the first or the second block thereof being applied with the three-dimensional orthogonal transform to form a signal to be recorded.

Further, the present invention provides a recording apparatus comprising: a divider to divide sequential pixels included in at least one pixel block of a video signal into a plurality of sub groups, the sub groups being distributed into a first main group and a second main group so that odd-number groups of the sub groups are sequentially distributed into the first main group and even-number groups of the sub groups are sequentially distributed into the second main group; a detector to detect correlation with respect to the pixels, in a horizontal direction and a vertical direction, of the sub groups distributed into the first and the second main groups separately; a pixel arranger to arrange the pixels of each sub group in a predetermined arrangement order according to the detected correlation separately with respect to the first and the second main groups; a frame generator, in response to the sub blocks in which the pixels are arranged, to generate a plurality of frames of pixels by interlaced scanning, separately with respect to the first and the second main groups; a block generator to generate a plurality of first blocks of (m pixels in a horizontal direction×m pixels in a vertical direction) per frame, m being an integer, separately with respect to the first and the second main groups; an orthogonal transformer to selectively apply a first orthogonal transform to the first blocks and a second transform to second blocks of (m pixels in the horizontal direction×m/2 pixels in the vertical direction) obtained by means of the first blocks to obtain an addition of and a difference between the results of the second transform in each second block, separately with respect to the first and the second main groups; and a coder to encode the video signal, the blocks thereof being selectively applied with the first and the second transform, together with respect to the first and the second main groups, to form a signal to be recorded.

Further, the present invention provides a recording and reproducing apparatus comprising: a divider to divide each of main pixel blocks of (m pixels in a horizontal direction×m pixels in a vertical direction×n pixels in a time direction) included in a video signal into a first block of (m/2 pixels in the horizontal direction×m pixels in the vertical direction×n pixels in the time direction) and a second block of (m pixels in the horizontal direction×m/2 pixels in the vertical direction×n pixels in the time direction), m and n being an integer; a detector to detect correlation between continuous two main pixel blocks in the horizontal and vertical directions; an orthogonal transformer to apply three-dimensional orthogonal transform to either of the first or the second block according to the detected correlation, an information signal being generated indicating which of the first or the second block being applied with the three-dimensional orthogonal transform; a coder to encode the video signal, the first or the second block thereof being applied with the three-dimensional orthogonal transform to form a signal to be recorded; a decoder to decode the formed signal; and an inverse-orthogonal transformer, with reference to the information signal, to apply three-dimensional inverse-orthogonal transform to the first or the second block to which the three-dimensional orthogonal transform is applied, the three-dimensional inverse-orthogonal transform being inversion of the three-dimensional orthogonal transform, to compose the main blocks which are divided into the first and the second blocks to reproduce the video signal.

Further, the present invention provides a recording and reproducing apparatus comprising: a first divider to divide sequential pixels included in at least one pixel block of a video signal into a plurality of sub groups, the sub groups being distributed into a first main group and a second main group so that odd-number groups of the sub groups are sequentially distributed into the first main group and even-number groups of the sub groups are sequentially distributed into the second main group; a detector to detect correlation with respect to the pixels, in a horizontal direction and a vertical direction, of the sub groups distributed into the first and the second main groups separately; a pixel arranger to arrange the pixels of each sub group in a first predetermined arrangement order according to the detected correlation separately with respect to the first and the second main groups; a frame generator, in response to the sub blocks in which the pixels are arranged, to generate a plurality of frames of pixels by interlaced scanning, separately with respect to the first and the second main groups; a block generator to generate a plurality of first blocks of (m pixels in a horizontal direction×m pixels in a vertical direction) per frame, m being an integer, separately with respect to the first and the second main groups; an orthogonal transformer to selectively apply a first orthogonal transform to the first blocks and a second transform to second blocks of (m pixels in the horizontal direction×m/2 pixels in the vertical direction) obtained by means of the first blocks to obtain an addition of and a difference between the results of the second transform in each second block, separately with respect to the first and the second main groups, an information signal being generated indicating which of the first and the second orthogonal transform being conducted; a coder to encode the video signal, the blocks thereof being selectively applied with the first and the second transform, together with respect to the first and the second main groups, to form a signal to be recorded; a decoder to decode the formed signal to obtain a first data and a second data with respect to the first and the second main groups, respectively; an inverse-orthogonal transformer, with reference to the information signal, to selectively apply a first inverse-orthogonal transform and a second inverse-transform to the first data and the second data, separately, the first and the second inverse-orthogonal transform being inversion of the first and the second orthogonal transform, respectively; a second divider to divide the first data and the second data, separately, into the sub groups; a pixel rearranger to rearrange the pixels of the sub groups in an rearrangement order which is inversion of the first arrangement order separately with respect to the first and the second main groups; and a pixel composer to arrange the sub groups in a predetermined second arrangement order to compose the sequential pixels included in the pixel block to reproduce the video signal.

BRIEF DESCRIPTION OF THE DRAWINGS

FIGS. 19A and 19B are views showing the arrangement of pixels;

DETAILED DESCRIPTION OF THE PREFERRED EMBODIMENTS

The recording and reproducing apparatus for digital image information according to the present invention will be described in detail hereinafter with reference to the accompanying drawings.

First, a recording system and a reproducing system in the first embodiment of the recording and reproducing apparatus for digital image information according to the present invention will be described with reference to FIGS. 6 and 7.

Figure 6:
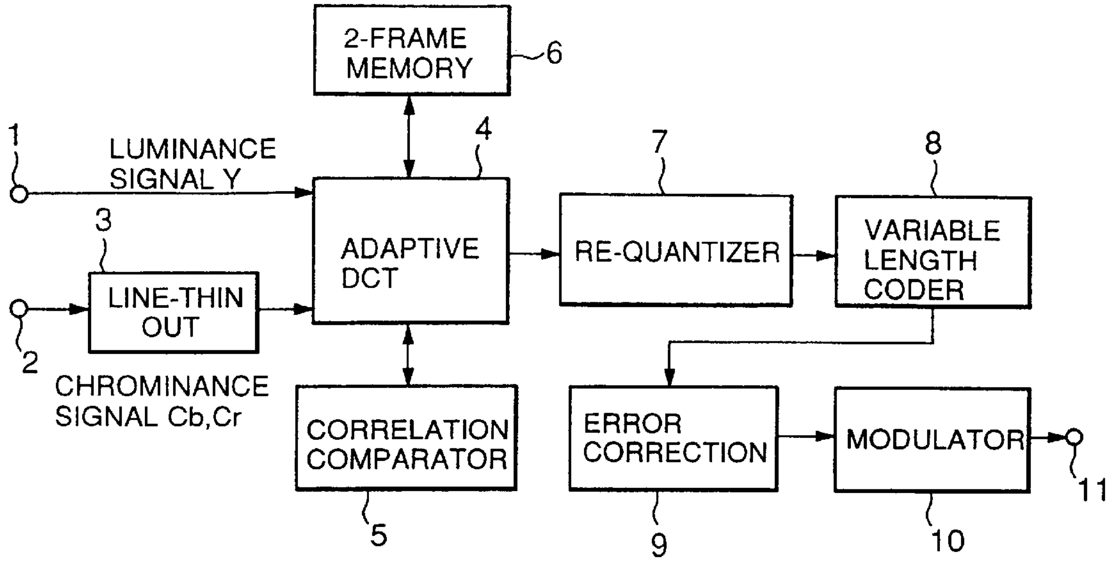
FIG. 6 is a block diagram of the first embodiment of a recording system of the recording and reproducing apparatus for digital image information according to the present invention.

In FIG. 6, a luminance signal Y in a video signal (image signal) according to a sequential scanning system is supplied to an input terminal 1, and two chrominance signals Cb and Cr in the video signal according to a sequential scanning system are supplied to an input terminal 2.

In the following embodiments, the luminance signal Y corresponding to each frame in the video signal supplied to the input terminal 1 is a digital signal corresponding to each frame in which the number of effective pixels in a horizontal direction is 720 and the number of effective lines in a vertical direction in one frame is 480. Further, the two chrominance signals Cb and Cr corresponding to each frame in the video signal supplied to the input terminal 2 are digital signals corresponding to each frame in which the number of effective pixels in a horizontal direction is 360 and the number of effective lines in a vertical direction in one frame is 480. In these digital signals, the respective pixel data is quantized in 8 bits.

The luminance signal Y supplied to the input terminal 1 is supplied to an adaptive DCT operation section 4, and the chrominance signals Cb and Cr supplied to the input terminal 2 are supplied to a line thin-out section 3. In the section 3, the two signals Cb and Cr are thinned out one by one so that the number of effective line in the vertical direction within one frame is 240. The resulting chrominance signals are supplied to the adaptive DCT operation section 4.

The section 4 once stores, in a two-frame memory 6, two-frame data of an odd-number frame and an even-number frame continuously supplied. Each frame data is composed of pixel data of the luminance signal Y and pixel data of the chrominance signals Cb and Cr.

Next, the adaptive DCT operation section 4 divides pixel data of the luminance signal Y and the chrominance signals Cb and Cr stored in the two-frame memory 6 into a pixel block (an original pixel block). The pixel block is composed of horizontally continuous pixels having a predetermined number of pixels and vertically continuous pixels having a predetermined number of pixels. Then, the pixel block is transferred to a longitudinal-lateral correlative comparison section 5.

The longitudinal-lateral correlative comparison section 5 carries out the comparing operations of the longitudinal-lateral correlative degrees with respect to the pixel data of the luminance signal Y, and the chrominance signals Cb and Cr to impart the results of the comparing operations of to the adaptive DCT operation section 4.

In the section 5, the comparing operations of the longitudinal-lateral correlative degrees individually carried out with respect to the pixel data of the luminance signal Y, and the chrominance signals Cb and Cr are the same as each other. Therefore, the comparing operation with respect to the pixel data of the luminance signal Y will be concretely explained.

Figure 8A:
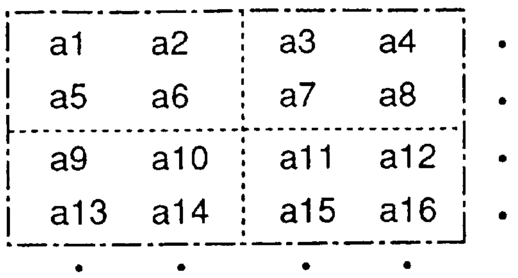
FIGS. 8A and 8B are views showing the arrangement of pixels.

The signs a1, a2, a3, a4 . . . a15 and a16 surrounded by the one-dotted line shown in FIG. 8A indicate pixel blocks (original pixel blocks) of horizontal 4 pixel×vertical 4 pixels cut off from the pixel data of the luminance signal Y of the odd-number image plane in two-frame (an odd-number image plane and an even-number image plane) data continuously supplied. Further, the signals b1, b2, b3, b4 . . . b15 and b16 surrounded by the one-dotted line shown in FIG. 8B indicate pixel blocks (original pixel blocks) of horizontal 4 pixel×vertical 4 pixels cut off from the pixel data of the luminance signal Y of the even-number image plane in the two-image plane data.

Figure 8B:
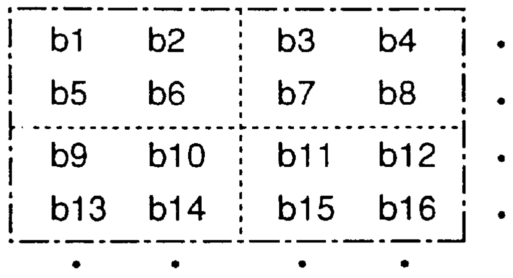

The longitudinal-lateral comparison section 5 first obtains an average value Aul of a group of pixel data of a1, a2, a5 and a6 and an average value Aur of a group of pixel data of a3, a4, a7 and a8 shown in FIG. 8A, and an average value Bul of a group of pixel data of b1, b2, b5 and b6 and an average value Bur of a group of pixel data of b3, b4, b7 and b8 shown in FIG. 8B.

The section 5 further obtains an average value Adr of a group of pixel data of a11, a12, a15 and a16 shown in FIG. 8A, and an average value Bdr of a group of pixel data of b11, b12, b15 and b16 shown in FIG. 8B.

Next, the section 5 performs calculation using the average values Aul, Aur, Bul, Bur, Adr and Bdr to obtain the following:

(1) the sum RH of an absolute value of a difference between the values Aur and Aul, and an absolute value of a difference between the values Bur and Bul, that is, $$RH=|Aur-Aul|+|Bur-Bul| \quad (1)$$

and (2) the sum RV of an absolute value of a difference between the values Aur and Adr and an absolute value of a difference between the values Bur and Bdr, that is, $$RV=|Aur-Adr|+|Bur-Bdr| \quad (2)$$

Next, the section 5 uses the formulae (1) and (2) to perform the comparison between the values RH and RV with respect to the correlative degrees of the pixel blocks (original pixel blocks) of horizontal 4 pixels×vertical 4 pixels of pixel data of a1, a2, a3 . . . a15 and a16 cut out from the odd-number image plane, and b1, b2, b3 . . . b15 and b16 cut out from the even-number image plane shown in FIGS. 8A and 8B, respectively.

If, RH>RV, it is considered that the correlative degree in the vertical direction is relatively higher than that in the horizontal direction. On the other hand, if, RH≦RV, it is considered that the correlative degree in the horizontal direction is relatively higher than that in the vertical direction. The longitudinal and lateral correlative comparison section 5 then imparts information showing the result of comparison to the adaptive DCT operation section 4.

Figure 9A:
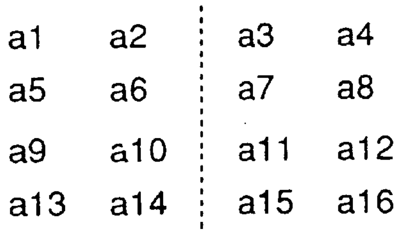
FIGS. 9A and 9B are views showing the arrangement of pixels.

In response to the information showing RH>RV, the section 4 divides the pixel block (original pixel block) of horizontal 4 pixels×vertical 4 pixels cut off from the pixel data of the luminance signal Y in the odd-number image plane into two pixel blocks AV1 and AV2 in the horizontal direction as shown in FIG. 9A. That is, the block AV1 (a divided pixel block) has horizontal 2 pixels×vertical 4 pixels of pixels a1, a2, a5, a6, a9, a10, a13 and a14. And the block AV2 (a divided pixel block) has horizontal 2 pixels×vertical 4 pixels of pixels a3, a4, a7, a8, a11, a12, a15 and a16. The section further performs two-dimensional DCT operation with respect to the horizontal 2 pixels×vertical 4 pixels in the blocks AV1 and AV2 as DCT blocks.

Figure 9B:
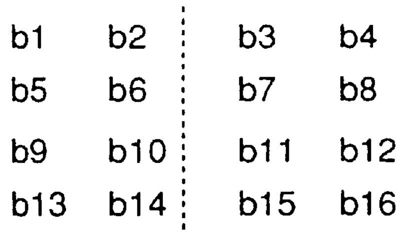

On the other hand, in response to the information showing RH≦RV, the section 4 divides the pixel block (original pixel block) of horizontal 4 pixels×vertical 4 pixels cut off from the pixel data of the luminance signal Y in the even-number image plane into two pixel blocks BV1 and BV2 in the horizontal direction as shown in FIG. 9B. That is, the block BV1 (a divided pixel block) has horizontal 2 pixels×vertical 4 pixels of pixels b1, b2, b5, b6, b9, b10, b13 and b14. And the block BV2 (a divided pixel block) has horizontal 2 pixels×vertical 4 pixels of pixels b3, b4, b7, b8, b11, b12, b15 and b16. The section further performs two-dimensional DCT operation with respect to the horizontal 2 pixels× vertical 4 pixels in the blocks BV1 and BV2 as DCT blocks.

Next, the adaptive DCT operation section 4 performs the following operation with respect to the DCT coefficients (DCT transform coefficients) obtained for the blocks AV1, AV2, BV1 and BV2 used as the DCT blocks. That is, the operations for obtaining the sum of and the difference between the DCT coefficients are carried out with respect to the pixel blocks AV1 and BV1, and also the pixel blocks AV2 and BV2.

The signal processing for performing these operations with respect to the pixel blocks AV1 and BV1, and AV2 and BV2 on the continuous two even- and odd-numbered image planes corresponds the signal processing for performing the DCT transform in the direction of time. Therefore, 3-dimensional DCT transform for horizontal 2 pixels× vertical 4 pixels×time 2 (an example of the case of n=2) is carried out by the signal processing described above. The result of operation by the adaptive DCT operation section 4 is supplied to a re-quantization section 7 in FIG. 6.

Figure 10A:
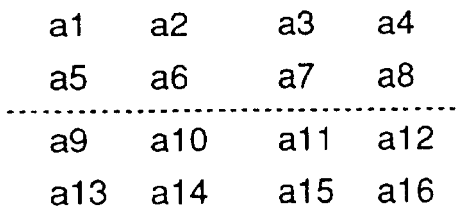
FIGS. 10A and 10B are views showing the arrangement of pixels.
Figure 10B:
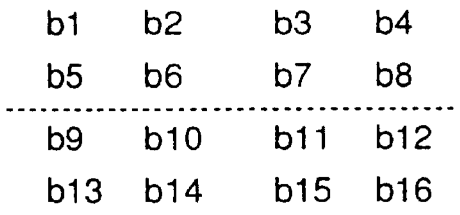

Further, in response to the information showing RH>RV, the section 4 divides the pixel block (original pixel block) of horizontal 4 pixels×vertical 4 pixels cut off from the pixel data of the luminance signal Y in the odd-number image plane into two pixel blocks AH1 and AH2 in the vertical direction as shown in FIG. 10A. That is, the block AV1 (a divided pixel block) has horizontal 4 pixels×vertical 2 pixels of pixels a1, a2, a3, a4, a5, a6, a7 and a8. And the block AH2 (a divided pixel block) has horizontal 4 pixels×vertical 2 pixels of pixels a9, a10, a11, a12, a13, a14, a15 and a16. The section further performs two-dimensional DCT with respect to the horizontal 4 pixels×vertical 2 pixels in the blocks AH1 and AH2 as DCT blocks.

On the other hand, in response to the information showing RH≦RV, the section 4 divides the pixel block (original pixel block) of horizontal 4 pixels×vertical 4 pixels cut off from the pixel data of the luminance signal Y in the even-number image plane into two pixel blocks BH1 and BH2 in the vertical direction as shown in FIG. 8B. That is, the block BH1 (a divided pixel block) has horizontal 4 pixels×vertical 2 pixels of pixels b1, b2, b3, b4, b5, b6, b7 and b8. And the block BH2 (a divided pixel block) has horizontal 4 pixels× vertical 2 pixels of pixels b9, b10, b11, b12, b13, b14, b15 and b16. The section further performs two-dimensional DCT with respect to the horizontal 4 pixels×vertical 2 pixels in the blocks BH1 and BH2 as DCT blocks.

Next, the adaptive DCT operation section 4 performs the following operation with respect to the DCT coefficients (DCT transform coefficients) obtained for the blocks AH1, AH2, BH1 and BH2 used as the DCT blocks. That is, the operations for obtaining the sum of and the difference between the DCT coefficients are carried out with respect to the pixel blocks AH1 and BH1, and also the pixel blocks AH2 and BH2.

The signal processing for performing these operations with respect to the pixel blocks AH1 and BH1, and AH2 and BH2 on the continuous two even- and odd-numbered image planes corresponds the signal processing for performing the DCT transform in the direction of time. Therefore, 3-dimensional DCT transform for horizontal 4 pixels× vertical 2 pixels×time 2 (an example of the case of n=2) is carried out by the signal processing described above. The result of operation by the adaptive DCT operation section 4 is supplied to the re-quantization section 7 in FIG. 6.

As described above, the adaptive DCT operation section 4 carries out the DCT operation in the adaptively and mutually different 3-dimensional orthogonal transform mode according to whether the result of comparison between RH and RV supplied from the longitudinal-lateral correlative comparison section 5 to the section 4 is RH>RV or RH≦RV.

The section 4 outputs the DCT coefficient data with respect to the original pixel block and also discrimination information. The discrimination information indicates whether the DCT operation carried out by the section 4 is in the first 3-dimensional orthogonal transform coding with respect to each pixel block of horizontal (m/2) pixels× vertical m pixels×time n pixels obtained by dividing the original pixel block into two in the horizontal direction or in the second 3-dimensional orthogonal transform coding with respect to each pixel block of horizontal m pixels×vertical (m×2) pixels×time n pixels obtained by dividing the original pixel block into two in the vertical direction. Here, m and n are an integer.

In the re-quantization section 7 supplied with the result of operation of the 3-dimensional DCT operation output from the section 4, a quantization table is selected for quantization (re-quantization) so that data amount within the segment of a predetermined number of original pixel blocks after the quantization and variable length coding becomes less than a predetermined value and closest to the predetermined value. In detail, the DCT blocks are divided into classes according to the condition, such as, dispersed values of pixel values within the DCT block, and the quantizing step is changed according to the classes to select one quantization table. The data output from the section 7 is supplied to a variable length coding section 8. The data train subjected to variable length coding is further subjected to formatting as data within the sync block as shown in FIG. 4.

Figure 4:
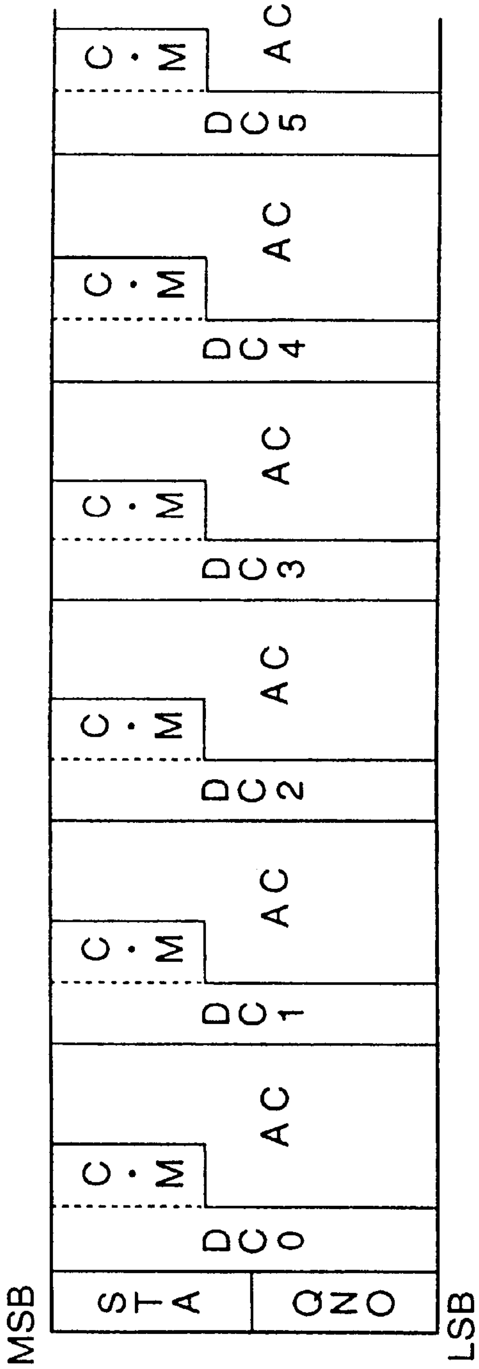
FIG. 4 is a view showing an example of arrangement of data storage region.
Figure 5:
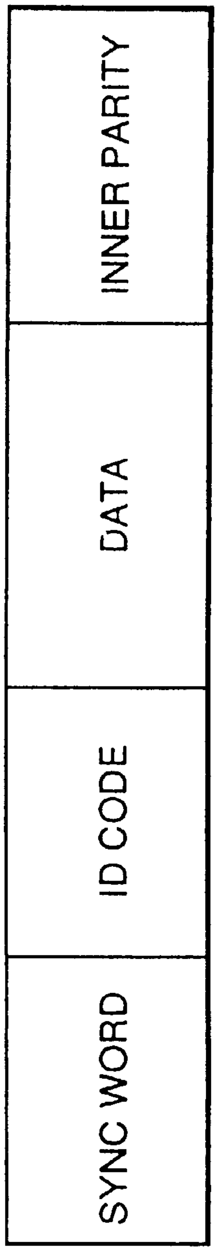
FIG. 5 is a view showing an example of constitution of sink blocks.

The discrimination information indicative of the type of the 3-dimensional orthogonal transform is stored as mode information of the DCT operation within the region indicated at M in FIG. 4.

The data formatted as described above is then input into an error correction coding section 9. The data corrected by the section 9 is supplied to a modulation section 10. The section 10 adds an ID word and a sync word to the corrected data and modulates them, and output them as recording data via output terminal 11.

In the case where a rotary magnetic head is connected to the output terminal 11, the recording data per frame is recorded on 10 recording tracks of a magnetic tape. Further, in the case where a transmission line is connected to the output terminal 11, the output data from the modulation section 10 is transmitted to a receiving apparatus through the transmission line.

The signal processing operations with respect to the chrominance signals Cb and Cr supplied from the line thin-out section 3 to the adaptive DCT operation section 4, re-quantizing section 7, variable length coding section 8, error correction section 9 and modulation section 10 are the same as the signal processing operations with respect to the luminance signal Y described above. Therefore, the explanation of the operations with respect to the chrominance signals Cb and Cr will be omitted.

In the embodiment of the recording system of the recording and reproducing apparatus described with reference to FIG. 6, a description has been made of the case where the original pixel block has horizontal 4 pixels×vertical 4 pixels and there are two pixels in the direction of time. It is, however, to be noted that in carrying out the invention, the recording system is not limited to the above but for example, the original pixel block may have horizontal 8 pixels× vertical 8 pixels×time 4 pixels and, any suitable and desired number of pixels can be selected. Further, the line thinning-out with respect to the color signals Cb and Cr in the previous embodiment need not always be carried out in the embodying the present invention.

Figure 7:
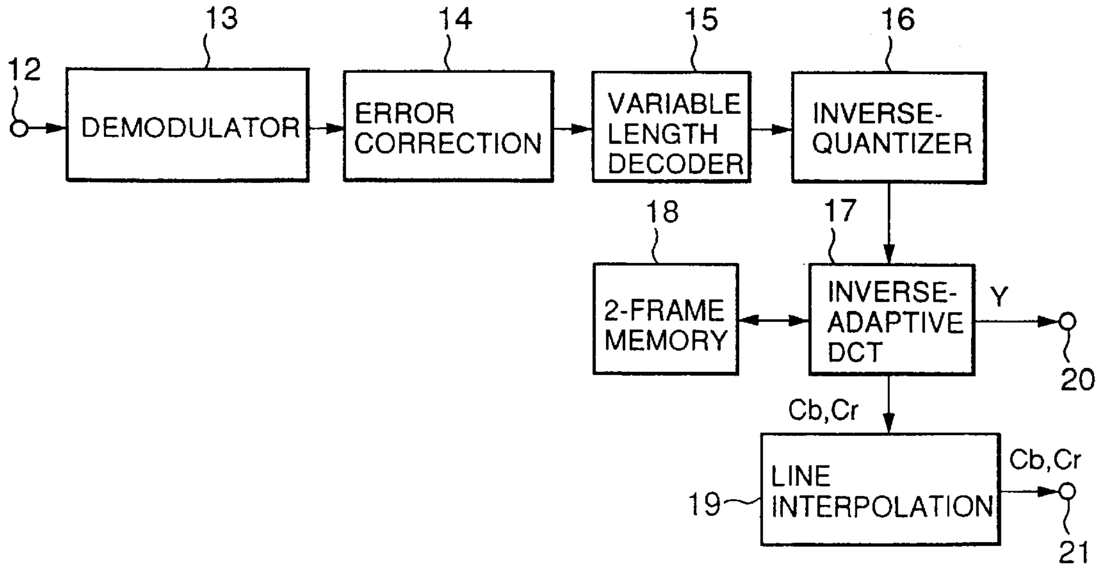
FIG. 7 is a block diagram of the first embodiment of a reproducing system of the recording and reproducing apparatus for digital image information according to the present invention.

Next, FIG. 7 is a block diagram showing the reproducing system for reproducing digital image information recorded on a magnetic tape using the recording system described with reference to FIG. 6. Not only the magnetic tape, the reproducing system shown in FIG. 7 can be used to reproduce digital image information transmitted through a transmission line.

Digital image information reproduced from the magnetic tape is input into a demodulation section 13 via input terminal 12. The demodulation section 13 carries out the demodulation operation which is reversed to the modulation operation carried out by the modulation section 10 of the recording system described with reference to FIG. 6 and supplies the demodulated data train to an error correction and decoding section 14.

The section 14 supplies the error-corrected data train to a variable length (code) decoding section 15. The section 15 decodes a variable length code with respect to data supplied thereto, and supplies the decoded data train to an (re)inverse-quantizing section 16. The section 16 carries out the inverse-quantizing signal processing and supplies the output data to an adaptive inverse-DCT operation section 17. The section 17 once stores the supplied data train in a two-frame memory 18.

The data train for two continuous frames stored in the two-frame memory 18 has been applied with the operations carried out by the adaptive DCT operation section 4. The operations are, as described above, to obtain the sum of and the difference between DCT transform coefficients individually obtained with respect to the pixel blocks in a mutually corresponding positional relation (for example, the divided pixel blocks AV1 and BV1 or AV2 and BV2) divided from two continuous frames (an odd-number frame and an odd-number frame) described above with reference to FIGS. 6, 8A to 10B. These operations correspond to the 3-dimensional DCTs for horizontal 2 pixels×vertical 4 pixels×time 2 (an example of n=2) as described above.

The adaptive inverse-DCT operation section 17 uses mode information of DCT operation stored in the region indicated by M in FIG. 4. The mode information indicates, as described above, the type of the 3-dimensional orthogonal transform coding to discriminate whether the DCT blocks for which the inverse-DCT operation should be carried out are the divided pixel blocks (AH1, AH2, BH1 and BH2) shown in FIGS. 10A and 10B or the divided pixel blocks (AV1, AV2, BV1 and BV2) shown in FIGS. 9A and 9B. The inverse-DCT operation is carried out adaptively in accordance with the results of discrimination to output them via output terminal 20, as the data train of the pixel data of the original pixel blocks shown in FIGS. 8A and 8B.

The chrominance signals Cb and Cr have been thinned out per line so that the number of lines is ½ as previously mentioned in the line thinning-out section 3 provided in the recording system shown in FIG. 6. Therefore, in reproducing the signals Cb and Cr, they are output via output terminal 21 after the number of lines are made double by the interpolation operation of a line interpolation section 19.

In the recording and reproducing apparatus for digital image information according to the present invention as described above with reference to FIGS. 6 and 7, DCT operation is carried out making use of higher correlation in a horizontal and a vertical direction in a frame and a correlation in the direction of time. Therefore, the efficient image information compression coding is enabled. In the case where the bit rate recorded in the recording medium is fixed, the quantized noise caused by the re-quantization can be reduced to achieve the improvement in quality at the time of compression and expansion.

The recording system and reproducing system according to a second embodiment of the recording and reproducing apparatus for digital image information of the present invention will be explained with reference to FIGS. 11 and 12.

The luminance signal Y in a video signal (an image signal) according to a sequential scanning system is supplied to the input terminal 1, and two chrominance signals Cb and Cr in a video signal according to the sequential scanning system is supplied to the input terminal 2.

In the following embodiment, the luminance signal Y corresponding to each image plane supplied to the input terminal 1 is a digital signal corresponding to each image plane in which the effective pixel number in a horizontal direction is 720 and the effective line number in a vertical direction in one frame is 480 in a frame. Further, the two chrominance signals Cb and Cr corresponding to each image plane supplied to the input terminal 2 are digital signals corresponding to each image plane in which the number of effective pixels in a horizontal direction is 360 and the effective line number in a vertical direction in one frame is 480 in a frame. In these digital signals, the respective pixel data is quantized in 8 bits.

The luminance signal supplied to the input terminal 1 is supplied to a motion compensation section 22, and the chrominance signals Cb and Cr supplied to the input terminal 2 are supplied to the line thinning-out section 3. The section 3 thins out the signals Cb and Cr in the form of digital signals such that the effective pixel number in a horizontal direction is 360, and the effective line number in a vertical direction in one frame is 480 are thinned out so that the effective line number in the vertical direction in one frame is 240 to supply them as the two chrominance signals Cb and Cr in the form of digital signals such that the effective pixel number in the horizontal direction is 360, and the effective line number in the vertical direction in one frame is 240 to the motion compensation section 22.

The section 22 calculates, as motion vectors, in what direction and how far the entire even-number image plane in two continuous image planes (an odd-number image plane and an even-number image plane) is moved relative to the odd-number image plane.

The odd-number image plane data of the two continuous image plane data, each composed of pixel data od luminance signal Y and pixel data of chrominance signals Cb and Cr is output to the succeeding adaptive DCT operation section 4 and once stored a one-frame memory 23.

Figure 13A:
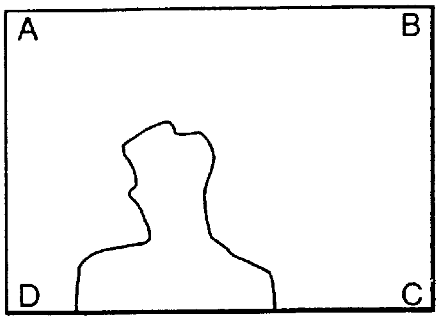
FIGS. 13A to 13D are views used for explaining motion vector.
Figure 13B:
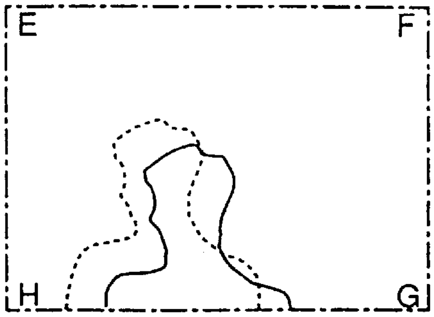

That is, the motion compensation section 22 uses an even-number image plane data continuously follows an odd-number image plane data and the odd-number image plane data stored in the one-frame memory 23 to calculate, as motion vectors, in what direction and how far the entire image content in the even-number image plane indicated by a one-dotted line frame EFGH in FIG. 13B is moved relative to the entire image content in the odd-number image plane indicated by a solid line frame ABCD in FIG. 13A.

The curved configuration shown by the solid line in FIG. 13A indicates the image content in the odd-number image plane, and the other curved configuration shown by the solid line in FIG. 13B indicates the image content in the even-number image plane.

On the other hand, the curved configuration shown by the dotted line in FIG. 13B is in the state in which the solid line box ABCD shown in FIG. 13A is properly put upon the one-dotted line box EFGH shown in FIG. 13B, and the curved configuration shown by the solid line in the odd-number image plane shown in FIG. 13A is in a position shown by the dotted line in the even-number image plane shown in FIG. 13B.

That is, there is shown in what direction and how far the entire image content in the even-number image plane is moved relative to the entire image content in the odd-number image plane due to the deviation in position between the curved configurations shown by the solid and the dot lines in the even-number image plane shown in FIG. 13B. The motion compensation section 22 calculates this movement as motion vectors.

Figure 13C:
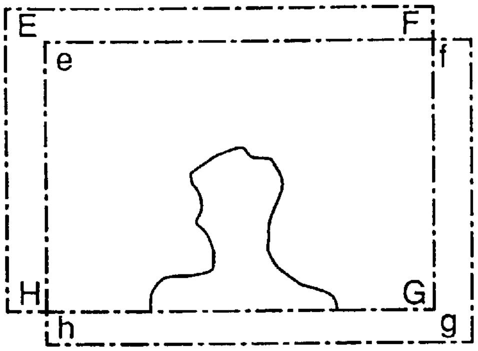
Figure 13D:
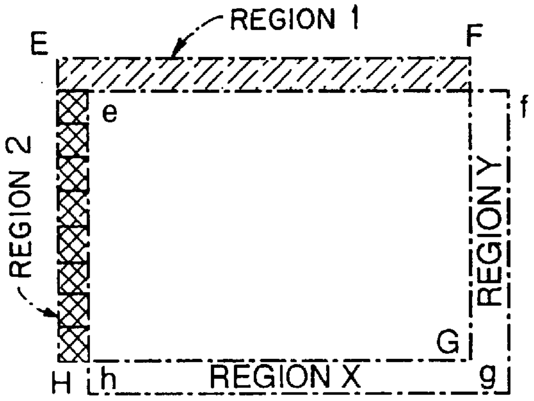

The section 22 uses the calculated motion vectors to carry out the motion compensation with respect to the image data of the even-number image plane so as to provide an even-number image plane data in which a position E at the left and upper portion in the even-number image plane is deviated by the motion vectors as shown in FIGS. 13C and 13D. Thereafter, the luminance signal Y, and the chrominance signals Cb and Cr subjected to the motion compensation are supplied to the succeeding adaptive DCT operation section 4.

Next, the motion compensation operation will be explained with reference to FIG. 13C further in detail. The box EFGH shown by the thick one-dotted line in FIG. 13C indicates the even-number image plane shown in FIG. 13B. The frame efgh shown by the fine one-dotted line in FIG. 13C indicates the state in which the position E at the left and upper corner of the even-number image plane is deviated by the motion vectors calculated by the motion compensation section 22.

The positional relationship between the curved configuration shown by the solid line and the box EFGH shown by the thick one-dotted line both shown in FIG. 13C is the same as that between the curved configuration shown by the solid line and the box EFGH shown by the thick one-dotted line both shown in FIG. 13B.

The positional relationship between the frame efgh shown by the fine one-dotted and the curved configuration shown by the solid line both shown in FIG. 13C is close to that between the curved configuration shown by the solid line and the frame ABCD shown by the thick one dotted line both shown in FIG. 13A.

Here, the box efgh shown in FIG. 13C is in the state where the position E at the left and upper corner of the frame EFGH shown by the thick one-dotted line is deviated to a position "e" at the left and upper corner in the box efgh.

The motion compensation is carried out corresponding to the motion vectors representative of the direction in deviation and the deviation amount between the position of the box EFGH and the position of the box efgh both shown in FIG. 13C. This results in many lower-order AC components included in DCT coefficients obtained by the adaptive DCT operation section 4 shown in FIG. 11.

Figure 14A:
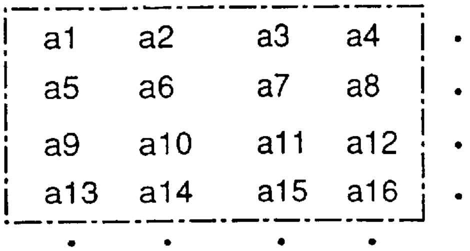
FIGS. 14A and 14B are views showing the arrangement of pixels.
Figure 14B:
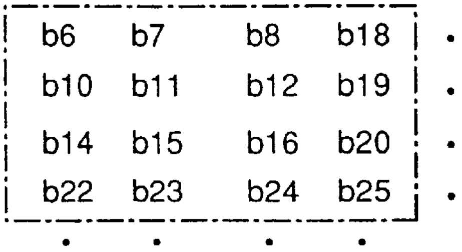

FIGS. 14A and 14B are views for explaining the operation of the motion compensation section 22, assuming that two continuous image planes are supplied to the section 22 such that the original pixel blocks in mutually corresponding positions in an odd-number image plane and an even-number image plane following the odd-number image plane are the pixel block (original pixel block) of horizontal 4 pixels×vertical 4 pixels of pixel data of a1, a2, a3 . . . a15 and a16 shown in FIG. 8A cut out of the odd-number image plane and the pixel block (original pixel block) of horizontal 4 pixels×vertical 4 pixels of pixel data of b1, b2, b3, b4 . . . b15 and a16 shown in FIG. 8B cut out of the even-number image plane.

Further, it is assumed in FIGS. 14A and 14B that the calculated motion vectors correspond to the state in which the entire image content in the even-number image plane is deviated by one pixel rightwardly and downwardly in the frame with respect to the entire image content in the odd-number image plane.

More in detail, FIG. 14A shows a pixel block (an original pixel block) in a specific position in an odd-number image plane. That is, this pixel block has horizontal 4 pixels× vertical 4 pixels constituted by cutting out pixel data a1, a2, a3 . . . a15 and a16 in a specific position in the odd-number image plane data. The pixel block shown in FIG. 14A is the same as that shown in FIG. 8A.

On the other hand, FIG. 14B shows a pixel block (original pixel block) of horizontal 4 pixels×vertical 4 pixels constituted by cutting out pixel data b6, b7, b8 . . . b15, b16, b18, b19, b20, . . . , b24 and b25 from the even-number image plane data in the state where the entire image content in the even-number image plane appearing next to the odd-number image plane is deviated by one pixel rightwardly and downwardly in the frame. The pixel block shown in FIG. 14B is constituted by pixel data different from that used to constitute the pixel block shown in FIG. 8B.

More in detail, the pixel block shown in FIG. 14B is constituted by the pixel block (original pixel block) in the state where it is deviated by one pixel rightwardly and downwardly with respect to the pixel block of horizontal 4 pixels×vertical 4 pixels constituted by pixel data b1, b2, b3, . . . , b15 and b16 cut out from the even-number image plane data shown in FIG. 8B.

There is a problem in signal processing with respect to pixel data in regions 1 and 2 shown in FIG. 11D when motion compensation is applied to an even-number image plane data by changing the way to cut out pixel data used for constituting an original pixel block for signal processing to the even-number image plane data in the case where the entire image content in the even-number image plane is deviated with respect to the entire image content in the odd-number image plane.

However, the signal processing may be carried out in the state where the pixel data in the regions 1 and 2 are moved to regions X (region 1-data destination) and Y (region 2-data destination), respectively, as shown in FIG. 13D.

In the recording system shown in FIG. 11, the functions of the adaptive DCT operation section 4, longitudinal-lateral correlation comparison section 5, two-frame memory 6, re-quantizing section 7, variable-length coding section 8, error correction section 9, modulation section 10 are the same as those described with reference to FIG. 6. Therefore, the description thereof will be omitted.

Figure 11:
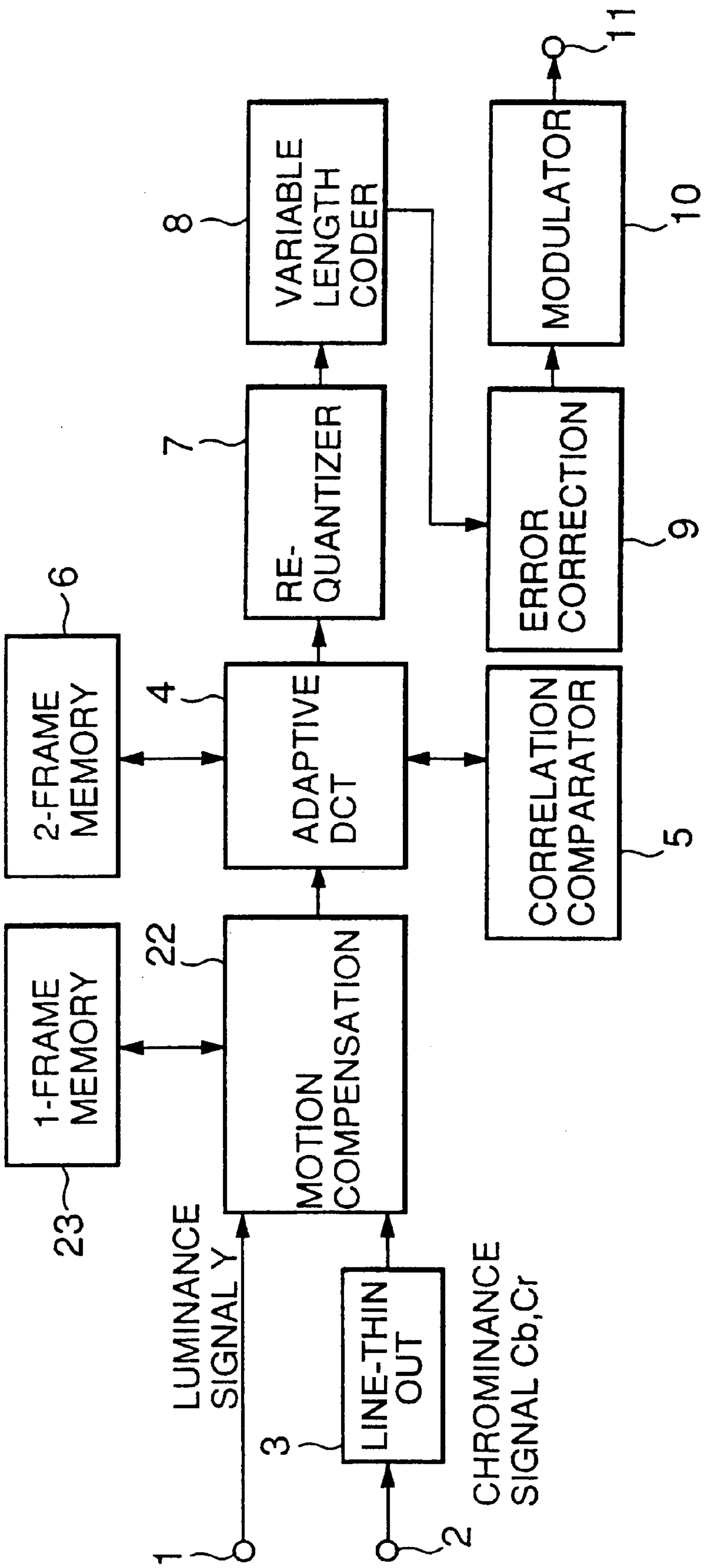
FIG. 11 is a block diagram of the second embodiment of a recording system of the recording and reproducing apparatus for digital image information according to the present invention.

However, in the recording system shown in FIG. 11, the motion compensation is carried out with respect to the even-number image plane data. It is therefore natural that information of the motion vector used for the motion compensation should be output with the signal to be recorded.

Figure 12:
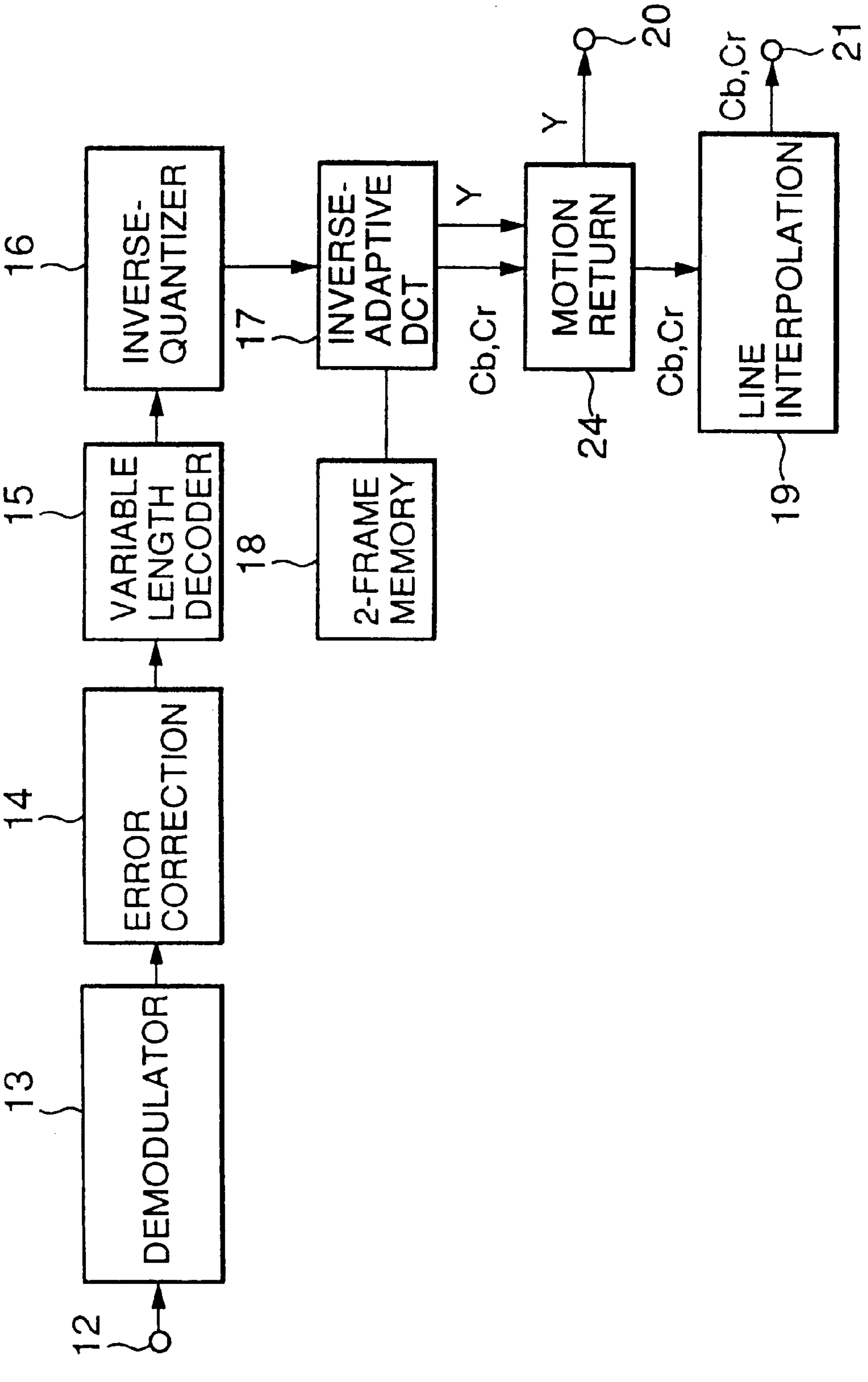
FIG. 12 is a block diagram of the second embodiment of a reproducing system of a recording and reproducing apparatus for digital image information according to the present invention.

FIG. 12 is a block diagram showing the reproducing system for reproducing digital image information recorded in the magnetic tape by (or transmitted through a transmission line from) the recording system shown in FIG. 11. The functions of the circuits from the demodulation section 13 to the adaptive counter-DCT operation section 17 are the same as those described with reference to FIG. 7. The description of those are therefore omitted.

In FIG. 12, as explained with reference to FIG. 7, the adaptive counter-DCT operation section 17 uses mode information of DCT operation stored in the region indicated at M in FIG. 4. The information indicates the type of the 3-dimensional orthogonal transform coding to discriminate whether the DCT blocks for which the inverse-DCT operation should be carried out are the divided pixel blocks AH1, AH2, BH1 and BH2 shown in FIGS. 10A and 10B or the divided pixel blocks AV1, AV2, BV1 and BV2 shown in FIGS. 9A and 9B. Then, the section 17 outputs the train pixel data obtained by adaptively carrying out the inverse-DCT operation in accordance with the results of discrimination to a motion return section 24.

The motion return section 24 carries out the operation for returning the motion compensation performed with respect to the even-number image plane data. Here, the motion compensation has been applied to the even-number image plane data by changing the cutting-out mode of the pixel data for the original pixel block used for the signal processing of the even-number image plane data according to the motion vector calculated by the motion compensation section 22 of FIG. 11 in the case where the entire image content in the even-number image plane is deviated with respect to the entire image content in the odd-number image plane.

In the motion return section 24, the operation for returning the moving compensation of the even-number image plane data applied with the motion compensation is carried out using the information of the moving vector generated by the recording system shown in FIG. 11. This operation is the opposite way of the operation of the motion compensation described with reference to FIGS. 13A to 13D, which can be easily understood and detail of which will not be described.

From the motion return section 24, the luminance signal Y is delivered, as the data train of pixel data of the original pixel block as shown in FIGS. 8A and 8B, to the output terminal 20. On the other hand, the chrominance signals Cb and Cr are output from the section 24 to the output terminal 21 after the number of lines is made double by a line interpolation section 19 since they have been thinned out per line so that the number of lines becomes ½ by the line thinning-out section 3 shown in FIG. 11.

In the recording and reproducing apparatus for digital image information according to the present invention described with reference to FIGS. 11 and 12, DCT operation is carried out making use of higher correlation in the horizontal direction or in the vertical direction in a frame and the correlation in the direction of time.

It is therefore to enable the efficient image information compression coding, and in the case where the bit rate recorded in the recording medium is fixed, the quantized noise caused by re-quantization can be reduced. An improvement in quality at the time of compression and expansion can be achieved. The correlation of pixels in the direction of time can be utilized more effectively with respect to the images obtained in the state where the image pickup device (TV camera) is panned to obtain easily a compressed and extended image of higher quality.

Next, the recording system and the reproducing system according to the third embodiment of the recording and reproducing apparatus for digital image information of the present invention will be explained with reference to FIGS. 15 and 16.

Figure 15:
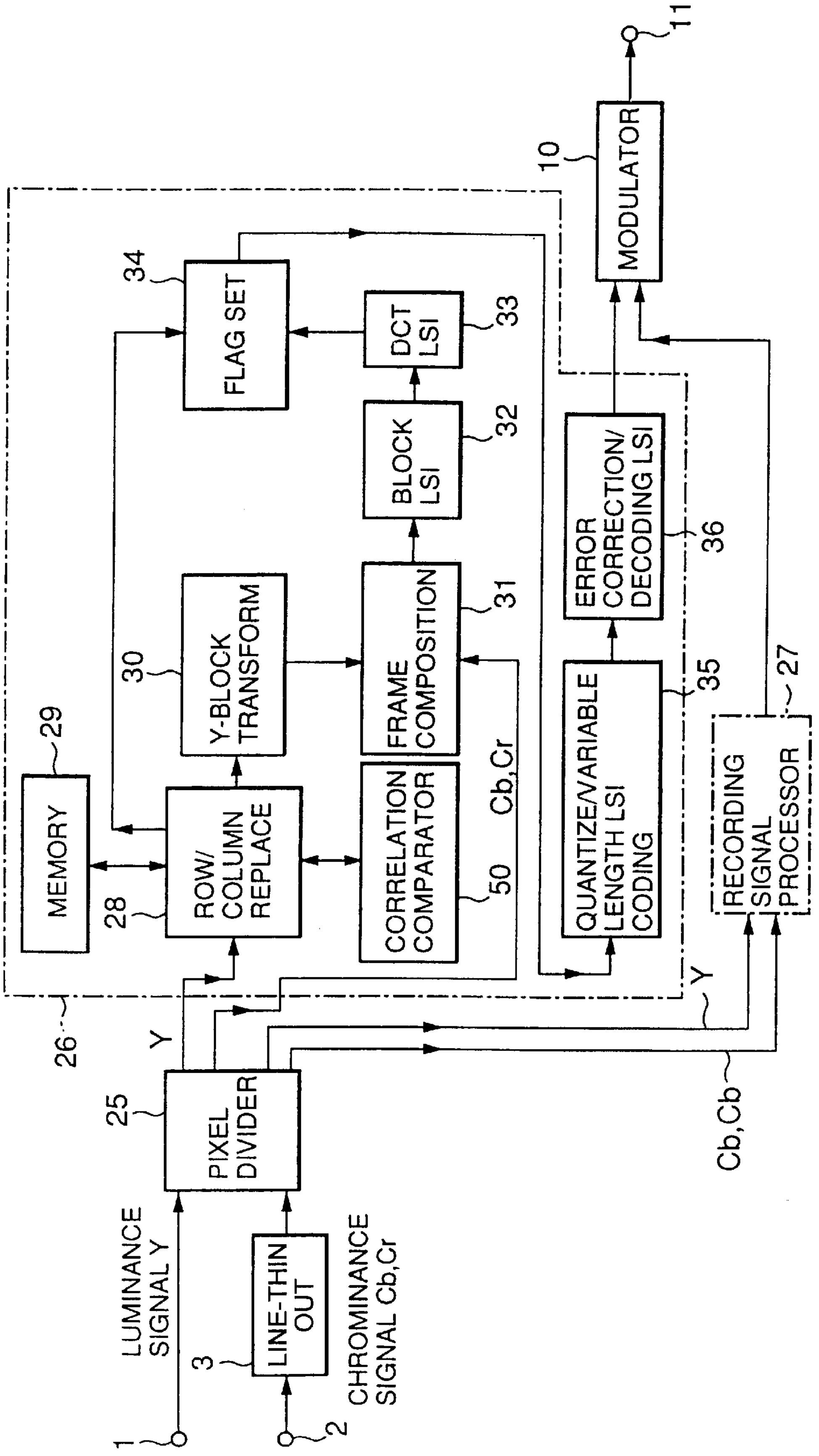
FIG. 15 is a block diagram of the third embodiment of a recording system of the recording and reproducing apparatus for digital image information according to the present invention.

In FIG. 15, the luminance signal Y in a video signal (image signal) such that the frame rate according to the sequential scanning system is 59.94 Hz is supplied to the input terminal 1, and two chrominance signals Cb, Cr according to the sequential scanning system are supplied to the input terminal 2.

In the following embodiments, the luminance signal Y corresponding to each image plane in the video signal supplied to the input terminal 1 is a digital signal corresponding to an image plane in which the number of effective pixels in a horizontal direction is 720 and the number of effective lines in a vertical direction in one frame is 480. On the other hand, the two chrominance signals Cb and Cr corresponding to each image plane in the video signal supplied to the input terminal 2 are a digital signal corresponding to an image plane in which the number of effective pixels in a horizontal direction is 360 and the number of effective lines in a vertical direction in one frame is 480. In the digital signals, the respective pixel data are quantified in 8 bits.

The luminance signal Y supplied to the input terminal is 1 supplied to a pixel division section 25, and two chrominance signals Cb and Cr supplied to the input terminal 2 are supplied to a line thin-out section 3.

In the line thin-out section 3, the chrominance signals Cb and Cr in the form of digital signals in which the number of effective pixels in the horizontal direction is 360 and the number of effective lines in the vertical direction in one frame is 480 are thinned out one by one so that the number of effective line in the vertical direction within one frame is 240.

Thus, chrominance signals Cb and Cr in which the number of effective pixels in the horizontal direction is 360 and the number of effective lines in the vertical direction within one frame is 240 are generated and supplied to the pixel division section 25.

The section 25 carries out pixel division operations with respect to the luminance signal Y, and the chrominance signals Cb and Cr. Each pixel division operation is to divide sequential pixels (pixel data) into groups of pixels each having a predetermined number of pixels and distribute and supply the groups of pixels to two recorded signal processing sections 26 and 27 sequentially and alternately.

The division operation of pixels in the pixel division section 25 will be concretely described. Described first is the case where, in the luminance signal Y, the effective pixel number in a horizontal direction is 720, and the effective line number in a vertical direction is 480. Sin 720 pixels are aligned per line on a frame, when the pixels are divided by 16 pixels into groups of pixels continuously rightward on each line from the pixel at the left end, 720 pixels aligned in the horizontal direction on each line are divided into 45 (=720/16) groups of pixels per line.

With respect to 45 groups of 45 pixels set per line, a group of pixels located in the left end of each line is called the first group of pixels, a group of pixels set rightward of the first group of pixels is called the second group of pixels and so on.

With respect to the first to the 44th group of pixels, the odd-number groups of pixels are supplied to the first recorded signal processing section 26. On the other hand, the even-number groups of pixels are supplied to the second recorded signal processing section 27.

Figure 17B:
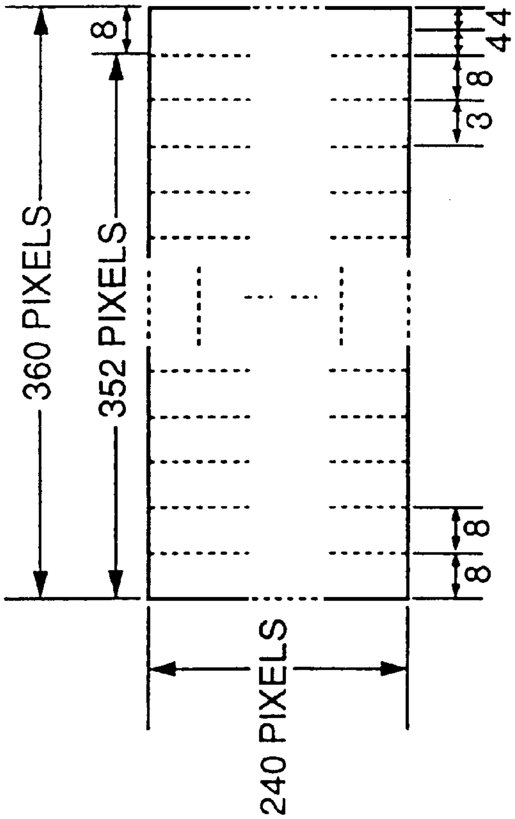
FIGS. 17A and 17B are views showing the arrangement of pixels.
Figure 17A:
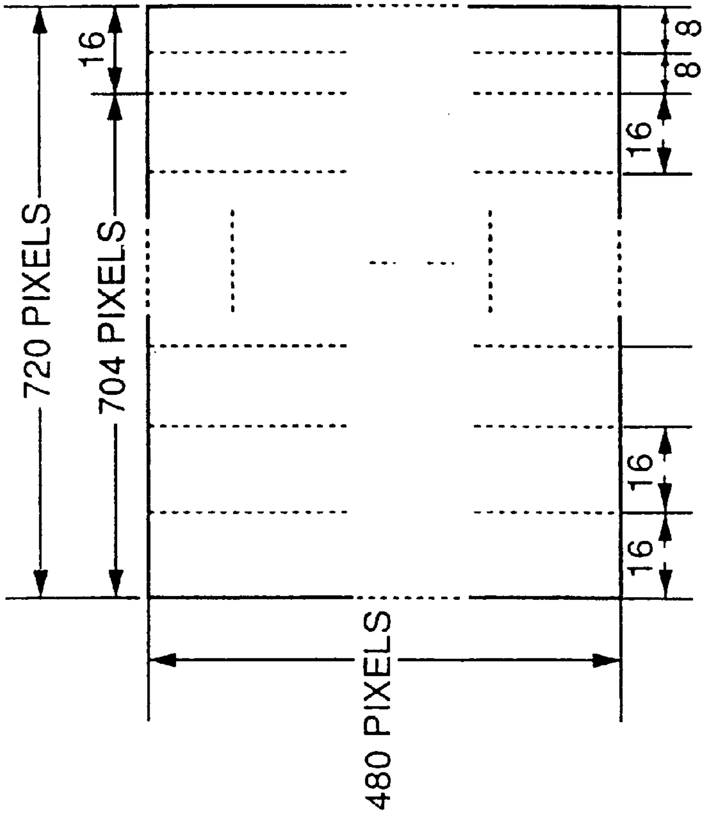
Figure 18B:
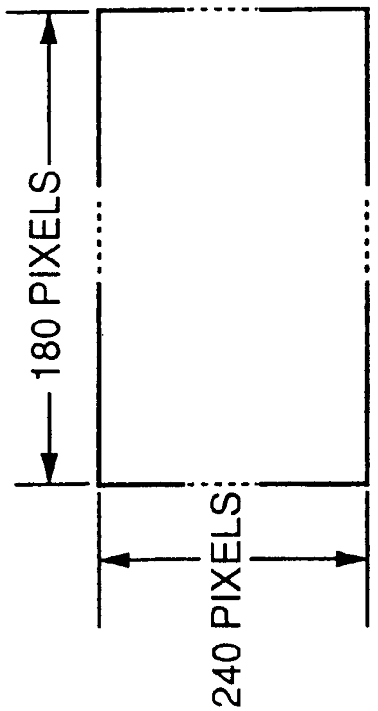
FIGS. 18A and 18B are views showing the arrangement of pixels.
Figure 18A:
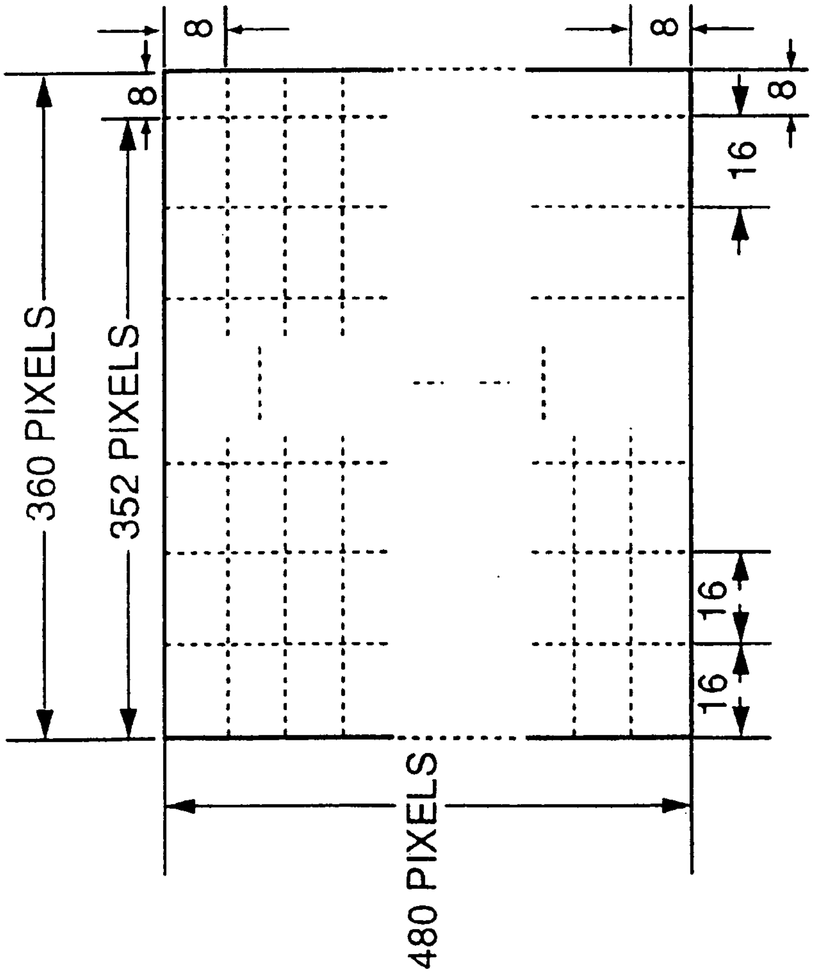

For the 45th group of pixels, there is carried out the pixel division operation such that 8 pixels located from the left end on each line are supplied to the first recorded signal processing section 26, and the remaining 8 pixels are supplied to the second recorded signal processing section 27 (see FIG. 17A and FIG. 18A).

The pixel division operation is carried out so that the operation starts from the left end of the uppermost line of the frame, sequentially shifts to the lower line one by one and completes at the right end of the lowermost line.

FIG. 17A shows an image plane of the luminance signal Y composed of 480 lines in which 720 pixels are aligned on in each line. This figure further shows that pixels from the pixel at the left end of each line to the 704th pixel are divided by 16 pixels to form the groups of pixels, and with respect to the remaining 16 pixels from the 705th pixel to the 720th pixel located at the right end of each line, 8 pixels from the 705th to the 712th pixels are used as one group of pixels, and other 8 pixels from the 713th to the 720th pixels are used as another group of pixels.

FIG. 18A is a view schematically showing one imaginary image plane of two imaginary image planes in the form of the same pixel arrangement obtained by dividing the pixels of one image plane of the luminance signal Y shown in FIG. 17A into two by the pixel division section 25 in FIG. 15.

The imaginary image plane shown in FIG. 18A is composed of 22 groups of pixels (352 pixels in all) constituted by 16 pixels per line and one group of pixels constituted by 8 pixels. Image plane data of two imaginary image planes as shown in FIG. 18A are output from the pixel division section 25. In detail, one frame data of the two imaginary image planes is supplied to the first recorded signal processing section 26 while the other to the second recorded signal processing section 27.

Next, the pixel division operation by the section 25 in the case where in the chrominance signal Cb, the effective pixel number in a horizontal direction is 360, and the effective line number in a vertical direction in one image plane is 240 will be described hereinafter. The effective line number 240 is obtained by thinning-out the original effective line number 480 by the line thinning-out section 3.

Since 360 pixels are aligned on a line, when the pixels are divided by 8 pixels continuously rightward on the line from the pixel at the left end of the line to form groups of pixels, 360 pixels aligned in a horizontal direction on the line are divided into 45 (=360/8) groups of pixels per line.

With respect to the 45 groups of pixels set per line, a group of pixels located in the left end of each line is called the first group of pixels, a group of pixels located rightward of the first group of pixels is called the second group of unit pixels and so on. With respect to the first to the 44th groups of pixels, the odd-number groups of pixels are supplied to the first recorded signal processing section 26, and the even-number groups of pixels to the second recorded signal processing section 27.

For the 45th group of pixels, there is carried out the pixel division operation such that, out of the 8 pixels, the former 4 pixels are supplied to the first recorded signal processing section 26, and the latter 4 pixels are supplied to the second recorded signal processing section 27 (see FIG. 17B).

The pixel division operation by the pixel division section 25 is carried out so that the operation starts from the left end of the uppermost line of the frame, sequentially shifts to the lower line one by one and completes at the right end of the lowermost line.

FIG. 17B shows an image plane of the chrominance signal Cb composed of 240 lines in which 360 pixels are aligned on each line, pixels from the pixel at the left end of each line to the 352th pixel are divided by 8 pixels to form the groups of pixels.

With respect to 8 pixels from the 353th pixel in a horizontal direction from the pixel at the left end of the line to the 360th pixel (pixel at the right end of the line), pixels from the 353th pixel to the 356th pixel are used as one group of unit pixels, and 4 pixels from the 357th pixel to the 360th pixel (pixel at the right end of the line) are used as another group of pixels.

FIG. 18B is a view schematically showing one imaginary image plane of two imaginary image planes in the form of the same pixel arrangement obtained by dividing pixels of one frame of the luminance signal Cb shown in FIG. 17A into two by the pixel division section 25.

The imaginary image plane shown in FIG. 18B is composed of 22 groups of pixels (176 pixels in all) constituted by 8 pixels per line and one group of pixels constituted by 4 pixels. Image plane data of two imaginary image planes in the form as shown in FIG. 18B are output from the pixel division section 25. In detail, the image plane data of one of the two imaginary image planes is supplied to the first recorded signal processing section 26 while the image plane data of the other image plane is supplied to the second recorded signal processing section 27.

The division operation of pixels with respect to the chrominance signal Cb by the pixel division section 25 so far described is the same as the division operation with respect to the chrominance signal Cr. Therefore, the description of the division operation with respect to the chrominance signal Cr will be omitted.

The first and the second recorded signal processing sections 26 and 27 to which is supplied image plane data of a single imaginary image plane in the form as shown in FIGS. 18A and 18B from the pixel division section 25 have the same configuration, and their signal processing operations are also the same. Therefore, FIG. 15 shows the concrete configuration of the first recorded signal processing section 26 only. The second section 27 is merely shown by the box indicated by one-dotted line.

In the following description, the function of the first recorded signal processing section 26 only will be described.

The luminance signal Y (image plane data of an imaginary image plane by the luminance signal Y) out of video signals supplied from the pixel division section 25 to the recorded signal processing section 26 is supplied to a row/column replacing section 28 provided in the section 26. The luminance signal Y supplied to the row/column replacing section 28 is shown in FIG. 18A and is composed of 22 groups of pixels (352 pixels in all) composed of 16 pixels and one group of pixels composed of 8 pixels per line in the image plane. In the section 28, the image plane data supplied thereto is divided into a pixel block of horizontal 8 pixels× vertical 8 pixels. In the case where the image plane data is of the odd-number image plane, the pixel block of horizontal 8 pixels×vertical 8 pixels are also supplied to a longitudinal-lateral correlation comparison section 50.

The section 50 compares the longitudinal correlation with the lateral correlation per pixel block of horizontal 8 pixels× vertical 8 pixels supplied thereto. In the comparison, the pixel block of horizontal 8 pixels×vertical 8 pixels is divided into four small blocks of horizontal 4 pixels×vertical 4 pixels to obtain an average value Au1 of pixel values of the small block at the left and upper part, an average value Aur of pixel values of the small block at the right and upper part, and an average value Adr of pixel values of the small block at the right and lower part in the four small blocks.

Obtained after this are an absolute value RH which is a difference between the average values Aur and Aul and an absolute value RV which is a difference between the average values Aur and Adr.

If the result of comparison between the value of RH and the value of RV is RV>RH, judgement is made that the lateral correlation degree is high, and if the result of comparison therebetween is RV≦RH, judgement is made that the longitudinal correlation degree is high. The function of the longitudinal-lateral correlation comparison section 50 is the same as that of the longitudinal-lateral correlation comparison section 5 described above with respect to FIG. 6.

Information of the result of comparison between the longitudinal and lateral correlations in the section 50 is imparted to the row/column replacing section 28.

In the case where the result of comparison between the longitudinal and lateral correlations is RV≦RH, that is, the longitudinal correlation degree is high, the row/column replacing portion 28 carries out the row/column replacement with respect to the arrangement of pixels of the pixel block by horizontal 8 pixels×vertical 8 pixels in the luminance signal Y (image plane data of an imaginary image plane by the luminance signal Y). The arranging modes of pixels shown in FIGS. 19A and 19B are illustrated with respect to the state in which the row is replaced by the column in the pixel arrangement.

Further, information of the state whether or not the replacement between row and column is done in connection with the arranging mode of pixels in the row/column replacing section 28 (which is the same as the state where the result of comparison between the values of RH and RV is RV≦RH or RV>RH) is stored from the section 28 to a memory 29 for storing the result of comparison and is also supplied to a flag setting section 34.

In the case where the luminance signal Y out of video signals supplied from the pixel division section 25 to the row/column replacing section 28 is image plane data of an even-number image plane, the result of comparison between longitudinal and lateral correlations with respect to the pixel block by horizontal 8 pixel×vertical 8 pixels in the same position in an odd-number image plane as that in the even-number image plane is read from the memory 29. Here, the odd-number image plane is located directly before the even-number image plane.

In the case where the result of comparison is high in longitudinal correlation degree, the replacement between row and column is carried out in connection with the arranging mode of pixels of the pixel block by horizontal 8 pixels×vertical 8 pixels in the luminance signal Y.

The image plane data output from the row/column replacing section 28 is imparted to a Y block transform section 30. The section 30 carries out, with respect to the image plane data supplied thereto, changing operation from the state of pixel arrangement as shown in FIG. 20A to pixel arrangement as shown in FIG. 20B, and changing operation from the state of pixel arrangement as shown in FIG. 20C to pixel arrangement as shown in FIG. 20D.

Figure 20A:
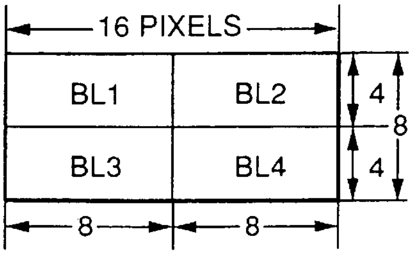
FIGS. 20A to 20D are views showing the arrangement of pixels.
Figure 20B:
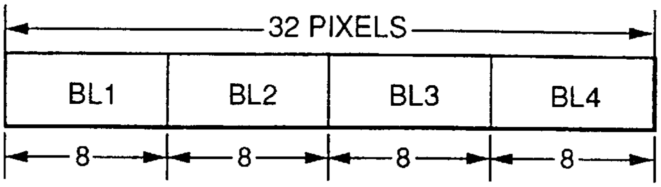
Figure 20C:
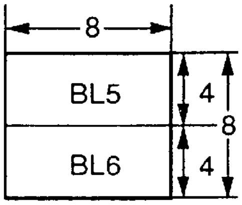
Figure 20D:
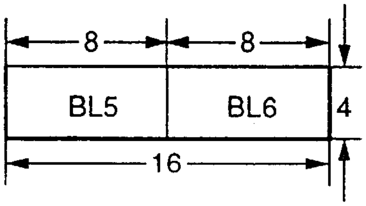

That is, in the Y block transform section 30, the image plane data supplied thereto is divided, first, with respect to the pixel block of horizontal 16 pixels×vertical 8 pixels, as shown in FIG. 20A, into four small pixel blocks BL, BL2, BL3 and B14, and two small pixel blocks BL3 and BL4 arranged below the four small pixel blocks are converted into the state where they are arranged on the right side of the two small pixel blocks BL1 and BL2, as shown in FIG. 20B. The frame data supplied to the section 30 is divided, next, with respect to the pixel block of horizontal 8 pixels×vertical 8 pixels, as shown in FIG. 20C, into two small pixel blocks BL5 and BL6, and a small pixel block BL6 located below the small pixel block BL5 is converted into the state whether it is located on the right side of the small pixel blocks BL5, as shown in FIG. 20 D.

The above operation in the Y block transform section 30 described with reference to FIGS. 20A and 20B is carried out with respect to pixels (horizontal 352 pixels×vertical 480 pixels) from the pixel (the first pixel) at the left end to the 352nd pixel of each line in an imaginary image plane (FIG. 18A) out of two imaginary image planes in the same pixel arrangement obtained by dividing the pixel of one frame of the luminance signal Y into two by the section 25.

The arrangement conversion of two longitudinal×two lateral small pixel blocks BL1, BL2, BL3 and BL4 into one longitudinal×four lateral pixels is not limited to the arrangement shown in FIG. 20B but for example, the small pixel blocks BL1, BL2, BL3 and BL4 may be arranged in order from the left side.

Further, the above operation in the Y block transform section 30 described with reference to FIGS. 20C and 20D is carried out with respect to pixels (horizontal 8 pixels× vertical 480 pixels) from the 353rd pixel to the pixel at the right end when the pixel at the left end of each line in an imaginary image plane (FIG. 18A) out of two imaginary image planes in the same pixel arrangement obtained by dividing the pixel of one frame by the luminance signal Y into two by the section 25 is the first pixel.

The frame data of the luminance signal Y supplied to the Y block transform section 30 corresponds to the imaginary image plane as shown in FIG. 18A. Further, the image plane data of the luminance signal Y output from the section 30 corresponds to the imaginary image plane as shown in FIG. 21.

The sequential image plane data of the luminance signal Y output from the Y block transform section 30 is supplied to a frame constitution section 31 by the interlaced scanning of 2:1. And, the image plane data of an imaginary image plane as shown in FIG. 18A of each of image data of two sequential imaginary image planes of the chrominance signals Cb and Cr output from the pixel division section 25 are also supplied to the frame constitution section 31.

Figure 21:
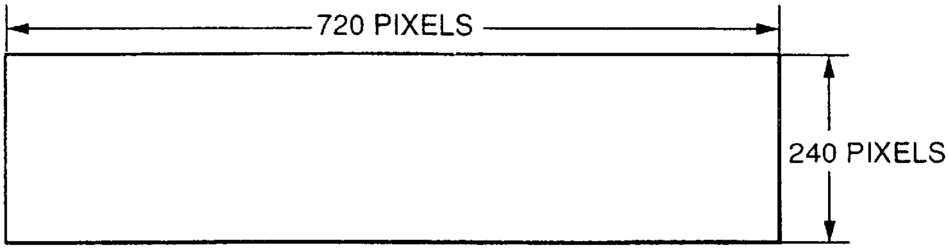
FIG. 21 is a view showing the arrangement of pixels.

In the section 31, data of luminance signal Y in the odd- and even number image planes of horizontal 720 pixels× vertical 240 pixels as shown in FIG. 21 sequentially supplied from the Y block transform section 30 are used as data of luminance signal Y of image planes of imaginary odd-number field and imaginary even-number field to generate data that is supplied to a LSI 32 for forming DCT block of DVC. The data is generated so as to constitute an imaginary image plane of the luminance signal Y of horizontal 720 pixels×vertical 480 pixels by interlaced scanning of 2:1 so that the i-th (i=1, 2, 3, . . . ) line of the image plane of the imaginary even-number field is located next to the i-th (i=1, 2, 3, . . . ) line in the image plane of the imaginary odd-number field.

Further, in the frame constitution section 31, image plane data of each imaginary image plane of image plane data of two sequential imaginary image planes of the chrominance signal Cb (or Cr) output from the pixel division section 25, that is, data of the chrominance signal Cb (or Cr) in the odd- and even-number image planes of horizontal 180 pixels× vertical 240 pixels as shown in FIG. 18B are used as data of the chrominance signal Cb (or Cr) of frames of the imaginary odd- and even-number fields data. The generated data is then supplied to the LSI 32. The data is generated so as to constitute an imaginary image plane of the luminance signal Y of horizontal 180 pixels×vertical 240 pixels by interlaced scanning of 2:1 so that the i-th (i=1, 2, 3, . . .) line of the image plane of the imaginary even-number field is located next to the i-th (i=1, 2, 3, . . . ) line in the image plane of the imaginary odd-number field.

The image data of the odd- and even-number fields constituting one frame data by the interlaced scanning system of 2:1 supplied from the frame constituting section 31 to the DCT block forming LSI32 are obtained on the basis of the continuous odd- and even-number image plane data in the video signals according to the sequential scanning system as previously described.

Pixels of the luminance signal Y in one image plane are in the form of a data train corresponding to the frame of horizontal 720 pixels and vertical 480 pixels, and pixels of the chrominance signals Cb and Cr are in the form of a data train corresponding to the image plane of horizontal 180 pixels and vertical 480 pixels, to be a data train of 4:1:1 type signals. Therefore, the data train can be subjected to various signal processing using a large scale integrated circuit (LSI) for DVC heretofore used for various signal processing in VCR in accordance with DVC Standards.

Figure 1A:
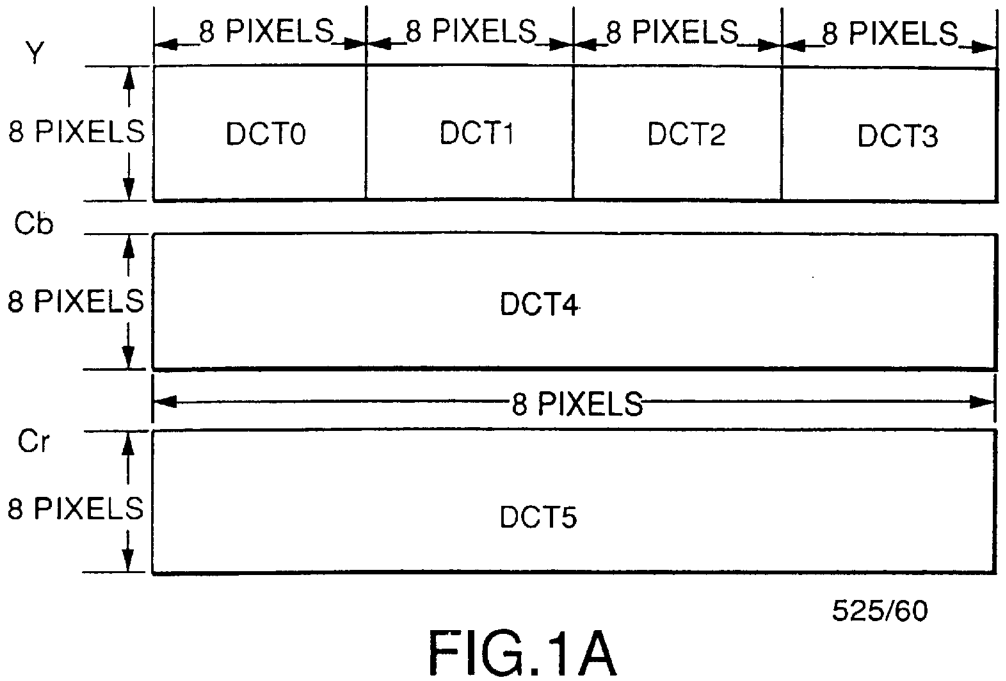
FIGS. 1A and 1B are views showing an example of constitution of macro blocks.

The DCT block forming LSI 32 supplied with the data train of 4:1:1 type signals from the frame constituting section 31 forms macro blocks constructed as shown in FIG. 1A, that is, DCT blocks DCT0 to DCT3 having the block size of horizontal 8 pixels×vertical 8 pixels with respect to the luminance signal Y, and DCT blocks DCT4 and DCT5 having the block size of horizontal 8 pixels×vertical 8 pixels with respect to the chrominance signals Cb and Cr. These macro blocks are constructed in accordance with the DVC Standards. And, the data train output from the LSI 32 is supplied to LSI33 for DCT operation of DVC.

The LSI33 performs the arithmetic operation in a predetermined DCT arithmetic mode for obtaining the sum of and the difference between DCT coefficients obtained per DCT block after the completion of DCT operation per DCT block of horizontal 8 pixels×vertical 4 pixels obtained by dividing the pixel block of horizontal 8 pixels×vertical 8 pixels by fields. This operation mode is set to a DCT mode setting terminal provided as one of input terminals in LSI33.

The LSI 33 carries out the DCT operation with respect to frame data of one frame according to the 2:1 interlaced scanning system constructed such that data of the luminance signal Y in the odd- and even-number frames of horizontal 720 pixels×vertical 240 pixels as shown in FIG. 21 sequentially supplied from the Y block transform section 30 corresponds to the 3-dimensional DCT of horizontal 8 pixels×vertical 4 pixels×time 2 pixels. Because pixel data removed from an odd-number frame by the sequential scanning corresponds to pixel data removed from another odd-number frame by the sequential scanning following the odd-number frame.

Further, with respect to the luminance signal Y, when judgement is made by the longitudinal-lateral correlation comparison section 5 that the longitudinal correlation degree is large, the row is replaced by the column, in the pixel arrangement, by the row/column replacing section 28 and thereafter, the signal Y is input to the DCT block forming LSI 32. Therefore, in terms of input signal, the 3-dimensional DCT of horizontal 8 pixels×vertical 4 pixels×time 2 pixels is carried out.

A flag M indicative of discrimination of arithmetic operating modes of the LSI 33 in addition to the DCT operation coefficients obtained by the DCT operation are output form the LSI33, and the flag M is supplied to the flag setting section 34.

The LSI 33 has two arithmetic operating modes, i.e., the DCT arithmetic operating mode for carrying out the DCT operation with respect to the DCT block of horizontal 8 pixels×vertical 8 pixels, and the DCT arithmetic mode for obtaining the sum of and the difference between the DCT coefficients obtained per DCT block after the completion of the DCT operation per DCT block of horizontal 8 pixels×vertical 4 pixels obtained by dividing the pixel block of horizontal 8 pixels×vertical 8 pixels by fields.

The flag setting section 34 extracts the flag M, which is replaced by the result of comparison by the longitudinal-lateral correlation comparison section 50 supplied from the row/column replacing section 28 to the section 34. No operation is carried out by the section 34 with respect to the DCT block by the chrominance signals Cb and Cr.

The output of the flag setting section 34 is supplied to a LSI35 for quantization of DVC and for variable length coding. The output of the section 34 is subjected to the variable length coding after quantization so that the data amount after the variable length coding will have a predetermined data amount within a video segment.

Figures 2A, 2B:
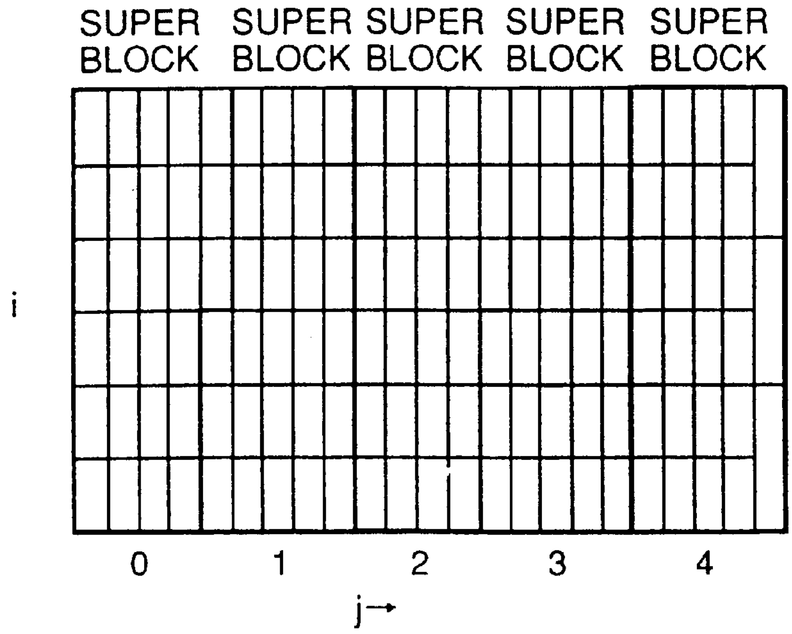
FIGS. 2A and 2B are views showing an example of constitution of super blocks.

The video segment is composed of five macro blocks as described above. That is, as shown in FIG. 2A, one video segment is constituted by dividing one frame into 50 super blocks S0, 0 SO, 1,, SO, 2,. . ., S9, 2, S9, 3, S9, 4, each constituted by 27 macro blocks, selecting one super block per column in 50 super blocks, and taking one macro block per super block thus selected to obtain 5 macro blocks.

The variable length coded data is subjected to formatting as data in the sync block shown in FIG. 4, and a DC component out of the DCT coefficients obtained with respect to the DCT blocks DCT0 to DCT5 constituting the macro block shown in FIG. 1A is stored in the DC storage region in the sync block. Here, the DCT operation is carried out to obtain the sum of and the difference between the DCT coefficients obtained per DCT block after the DCT operation has been carried out per DCT block of horizontal 8 pixels× vertical 4 pixels. In this case, the component of the sum of the DC DCT coefficients is stored in the DC storage region. Further, AC components out of the DCT coefficients obtained with respect to the DCT blocks DCT0 to DCT5 are stored in an AC storage region in the same sync block as the sink block in which stored are the DC components described above. In the case where the data amount of AC components out of the DCT coefficients is larger than the memory capacity of the storage region, they are stored in a vacant AC storage region in the sync block or a vacant AC storage region in the same video segment.

The formatted data is then input to an error correction coding LSI 36 of DVC. Incidentally, data of five super blocks aligned in one row shown in FIG. 2A are data of one video sector. The LSI 36 carries out the outer correction coding with respect to data of the one video sector. Further, data of each sync block is subjected to the inner correction coding. Data output from the LSI 36 is supplied to the modulation section (modulating LSI) 10.

The section 10 supplied with data adds an ID word and a sink word to the data and thereafter applies modulation thereto to supply them as recording data to a rotary magnetic head. Data for one frame are recorded on a magnetic tape by the rotational magnetic head so that they are recorded on 10 recording tracks.

The recording data supplied from the modulation section 10 to the rotary magnetic head are in the data arrangement such that recording data corresponding to data supplied to the section 10 from the LSI 36 provided in the recording signal processing section 26 are recorded in the first half portion of each recording track, and recording data corresponding to data supplied to the modulation section 10 from the LSI 36 provided in the recording signal processing section 27 are recorded in the second half portion of each recording track.

The signal processing with respect to data reproduced by the rotary magnetic head from the magnetic tape in which the data is recorded by the recording system described with reference to FIG. 15 is carried out by a reproducing system shown in FIG. 16.

The data reproduced by the rotary magnetic head from the magnetic tape is supplied to the demodulation section (demodulating LSI) 13 via terminal 12. After demodulation, the data reproduced from the first half portion of each recording track is supplied to the first reproduced signal processing section 37, and the data reproduced from the latter half portion of each recording track is supplied to the second reproduced signal processing section 38.

The first and the second reproduced signal processing sections 37 and 38 have the same configuration, and their signal processing operations are also the same. Therefore, in FIG. 16, only the concrete configuration of the first section 37 is shown. The second section 38 is merely indicated by one-dotted line. Reproduced data subjected to the signal processing by the first section 37 is data subjected to signal processing by the first recording signal processing section 26 in the recording system of FIG. 15. And, reproduced data subjected to the signal processing by the section 38 is data subjected to signal processing by the second recording signal processing section 27 in the recording system of FIG. 15. In the following description, the functions of the first and second reproduced signal processing sections 37, 38 will be explained by taking the first section 37 only.

The error correction decoding LSI 39 of DVC of the section 37 supplied with reproduced data from the demodulation section 13 carries out the error correction processing to correct data errors mixed during reproduction. In the case where there is an error that cannot be corrected, it is corrected using data reproduced for the frame immediately before. In detail, an error is replaced by data of the sync block for storing macro block data in the same position on a frame of the previous frame. Output data from the LSI 39 is supplied to a variable length decoding/inverse-quantization LSI 40 of DVC. The LSI 40 decodes the variable length code of the data supplied thereto, and carries out the inverse-quantization thereto, supply it to a flag extraction section 41.

The section 41 extracts positional data of the flag M, with respect to the DCT block of the luminance signal Y, to supply the data to a row/column return section 46. Further, the section 41 divides the flag M by field, carries out 8×4 DCT operation by the block of horizontal 8 pixels×vertical 4 pixels, and rewrites it to data indicative of the mode for obtaining the sum of and the difference between the DCT coefficients. Nothing is done for the DCT blocks with respect to the two chrominance signals Cb and Cr. Output from the section 41 is supplied to a next inverse-DCT operation LSI42 of DVC.

In the LSI 42, since all the input flags M are data indicative of the mode in which the 8×4 DCT operation is carried out with horizontal 8 pixels×vertical 4 pixels by dividing them by fields and for obtaining the sum of and the difference between the DCT coefficients, inverse-operation corresponding to the above operation is selected and executed. Output of the LSI 42 is supplied to the next pixel arranging LSI 43 of DVC. In the LSI 43, input data is made into image data of a Y signal of one frame and two chrominance signals Cb and Cr, which are supplied to a frame division section 44 for interlaced scanning of 2:1 per frame.

The frame division section 44 performs the signal processing reverse to the signal processing carried out by the frame constituting section 31 with interlaced scanning of 2:1 in the recording system described with reference to FIG. 15. In detail, the section 44 divides one frame data composed of the luminance signal Y of horizontal 720 pixels×vertical 480 pixels by imaginary interlaced scanning into imaginary odd- and even-number image plane data, both of horizontal 720 pixels×vertical 240 pixels as shown in FIG. 21. The odd-number image plane is composed of odd-number lines only. And, the even-number image plane is composed of even-number lines only. Both of the imaginary odd- and even-number image plane data are supplied to a Y block inverse transform section 45.

The section 44 further divides one imaginary image plane data composed of the chrominance signal Cb (Cr) of horizontal 180 pixels×vertical 480 pixels into imaginary odd- and even-number image plane data, both of horizontal 180 pixels×vertical 240 pixels as shown in FIG. 18B. The odd-number image plane is composed of odd-number lines only. And, the even-number image plane is composed of even-number lines only. Both of the imaginary odd- and even-number image plane data are supplied to an image composing section 47.

The Y block inverse-transform section 45 sequentially supplied with the odd- and even-number imaginary image plane data of the luminance signal Y carries out the signal processing reversed to that carried out by the Y block transform section 30 of FIG. 15.

In detail, the image plane data supplied from the frame division section 44 to the Y block inverse-transform section 45 is in the state of horizontal 32 pixels×vertical 4 pixels. The section 45 first divides the image plane data horizontal 32 pixels×vertical 4 pixels into four small pixel blocks BL1, BL2, BL3 and BL4, each composed of horizontal 8 pixels× vertical 4 pixels as shown in FIG. 20B. Then, the section 45 converts the four small pixel blocks into those in the state of arrangement as shown in FIG. 20A so as to constitute the pixel block of horizontal 16 pixels×vertical 8 pixels.

The operation in the Y block inverse-transform section 45 described with reference to FIGS. 20A and 20B is carried out with respect to the pixels from the first on the left end of each line to the 704th pixel, totally horizontal 704 pixels× vertical 240 pixels in imaginary image plane of horizontal 720 pixels×vertical 240 pixels as shown in FIG. 21. The remaining pixels (horizontal 16 pixels×vertical 240 pixels) on the right side of the frame shown in FIG. 21 are divided into two pixel blocks BL5 and BL6, each of horizontal 8 pixels×vertical 4 pixels as shown in FIG. 20D, and the right-hand block BL6 is converted into one in the state located under the left-hand block BL5 as shown in FIG. 20C.

The output of the Y block inverse-transform section 45 thus corresponds to the imaginary image plane of the luminance signal Y of horizontal 360 pixels×vertical 480 pixels as shown in FIG. 18A, and the output is supplied to a row/column return section 46.

The section 46 carries out the replacing operation between row and column in the pixel arrangement referring to signals supplied from the flag extraction section 41 in unit of a pixel block of horizontal 8 pixels×vertical 8 pixels. That is, the replacing operation is carried out with respect to the pixel blocks in which the row/column replacing operation has been carried out by the row/column replacing section 28 in the recording system of FIG. 15, when detected that the longitudinal correlation is large as the result of comparison between longitudinal and lateral correlations by the longitudinal and lateral correlation comparison section 50 of FIG. 15.

The image plane data of the luminance signal Y and the image plane data of the chrominance signals Cb and Cr respectively output from the row/column return section 46 and the frame division section 44 provided in the first and the second reproduced signal processing sections 37*a* and 38 are all supplied to the pixel composing section 47.

The section 47 carries out the pixel composing by the signal processing operation reversed to that carried out by the pixel division section 25 in the recording system described with reference to FIG. 15.

That is, the following signal processing operation is carried out in the pixel composing section 47. First, with respect to the luminance signal Y, 16 pixels at the left and upper end of the image plane data output from the first reproduced signal processing section 37 are arranged on one line. Then, 16 pixels at the left and upper end of the image plane data output from the second reproduced signal processing section 38 are continuously arranged on the line continuous to the right side of the first-mentioned 16 pixels. Thus, 32 pixels are arranged on the line.

Next 16 pixels in the frame data of the luminance signal Y output from the first reproduced signal processing section 37 are arranged continuous to the right side of the 32 pixels previously arranged on the line, and then next 16 pixels in the image plane data of the luminance signal Y output from the second reproduced signal processing section 38 are arranged continuous to the right side of the first-mentioned 16 pixels.

The image plane data of the luminance signal Y output from the first and the second reproduced signal processing sections 37 and 38 are sequentially and alternately arranged on one line by 16 pixels. When 704 pixels are finished to be arranged on one line, 8 pixels of the image plane data output from the first and the second sections 37 and 38 are sequentially arranged on the right side of the 704 pixels so that 720 pixels are arranged on one line.

The sequential arranging operation of pixels is repetitively carried out per line in the pixel composing section 47 whereby continuous image plane data of the luminance signal Y according to the sequential scanning system are delivered from the section 47 to the output terminal 20 by means of the image plane data of the luminance signal Y supplied from the first and the second reproduced signal processing sections 37 and 38 to the section 47.

Next, the signal processing operation with respect to the chrominance signals Cb and Cr carried out by the pixel composing section 47 will be explained. The arranging operation of pixels carried out with respect to the chrominance signal Cb in the section 47 is the same as that with respect to the chrominance signal Cr. Therefore, in the following description, only the operation with respect to the chrominance signal Cb will be typically explained.

First, 8 pixels at the left and upper end of the image plane data of the chrominance signal Cb output from the first reproduced signal processing section 37 are arranged on one line. And after this, 8 pixels at the left and upper end of the image plane data of the chrominance signal Cb output from the second reproduced signal processing section 38 are continuously arranged on the line, continuous to the right side of the first-mentioned 8 pixels. Thus, 16 pixels are arranged on the line.

Then next 8 pixels in the image plane data of the chrominance signal Cb output from the first reproduced signal processing section 37 are arranged continuous to the right side of the 16 pixels arranged on the line. Ad after this, 8 pixels at the left and upper end of the image plane data of the chrominance signal Cb output from the second reproduced signal processing section 38 are arranged to the right side of the first-mentioned 8 pixels.

The image data of the chrominance signal Cb output from the first and the second reproduced signal processing section 37 and 38, as described above, are sequentially and alternately arranged on one line by 8 pixels. When 352 pixels are finished to be arranged on the line, 4 pixels of the image plane data output from the first section 37 and 4 pixels of the frame data output from the second section 38 are sequentially arranged on the right side of the 352 pixels arranged on the line so that totally 360 pixels are arranged on one line.

The arranging operation of pixels as described above is repetitively carried out per line by the pixel composing section 47 whereby continuous image plane data of horizontal 360 pixels×vertical 240 pixels are delivered as the image plane data of chrominance signal Cb according to the sequential scanning system to the line interpolation section 19 from the section 47 by means of the image plane data of the chrominance signal Cb supplied from the first and second reproduced signal processing sections 37 and 38 to the pixel composing section 47.

The arranging operation of pixels with respect to the chrominance signal Cr in the section 47 is the same as that with respect to the chrominance signal Cb. The image data of the chrominance signals Cb and Cr of horizontal 360 pixels×vertical 240 pixels given from the section 47 to the line interpolation section 19 are interpolated so that the number of lines becomes double and are delivered as data of the chrominance signals Cb and Cr of horizontal 360 pixels× vertical 480 pixels to the output terminal 21.

The recording system of one embodiment of the recording and reproducing apparatus for digital image information whose object to be recorded is a video signal of the sequential scanning according to the 625/50 system will be explained hereinafter.

Figure 22:
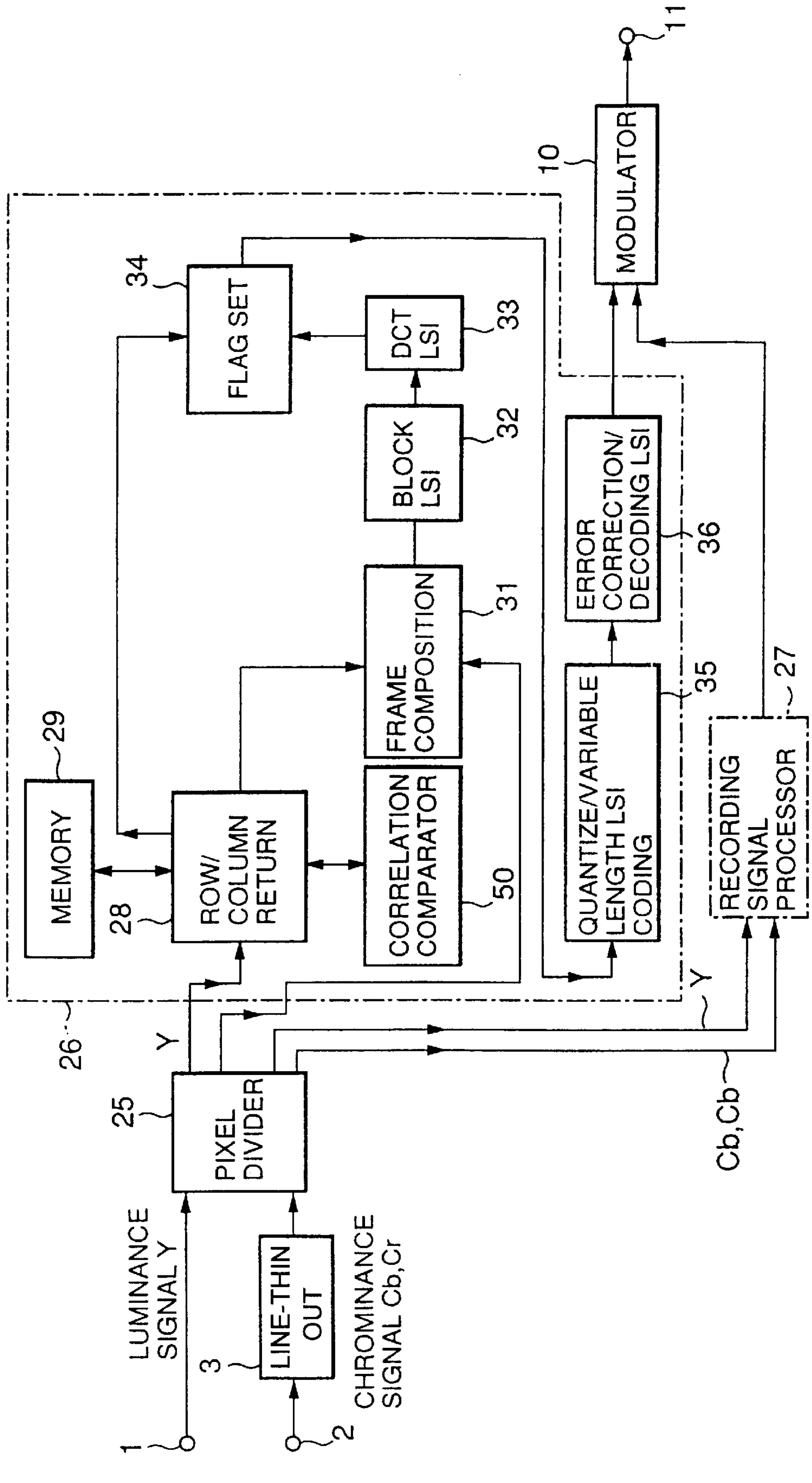
FIG. 22 is a block diagram of the fourth embodiment of a recording system of the recording and reproducing apparatus for digital image information according to the present invention.

In FIG. 22, the luminance signal Y in a video signal (image signal) whose frame rate according to the 625/50 sequential scanning system is 50 Hz is supplied to the input terminal 1, and two chrominance signals Cb and Cr in the video signal according to the sequential scanning system are supplied to the input terminal 2.

In the following embodiment, the luminance signal Y corresponding to each image plane in the video signal according to the sequential scanning system supplied to the input terminal 1 is a digital signal corresponding to each image plane whose effective pixel number in a horizontal direction is 720, and effective line number in a vertical direction in one frame is 576. Further, two chrominance signals Cb and Cr corresponding to each image plane in the video signal according to the sequential scanning system supplied to the input terminal 2 is a digital signal corresponding to each image plane whose effective pixel number in a horizontal direction is 360, and effective line number in a vertical direction in one frame is 576. In the digital signals, the respective image data is quantized with 8 bits.

The luminance signal Y supplied to the input terminal 1 is supplied to the pixel division section 25, and the two chrominance signals Cb are Cr supplied to the input terminal 2 are supplied to the line thinning-out section 3. The section 3 thins out the chrominance signals Cb and Cr in the form of a digital signal whose effective pixel number in the horizontal direction is 360, and effective line number in the vertical direction in one frame is 576 so that the effective line number in the vertical direction in one frame is 288. The signals are supplied as two chrominance signals Cb and Cr in the form of a digital signal whose effective pixel number in the horizontal direction is 360, and effective line number in the vertical direction in one frame is 288 to the pixel division section 25.

The section 25 carries out the pixel division operations with respect to the luminance signal Y, and the chrominance signals Cb and Cr.

That is, the section 25 carries out the pixel division operation per signal in which sequential pixels (pixel data) are divided by a predetermined number of continuous pixels into continuous groups of pixels, and are sequentially and alternately distributed to the recording signal processing sections 26 and 27.

The division operation of pixels by the pixel division section 25 shown in FIG. 22 will be explained concretely.

Figure 23A:
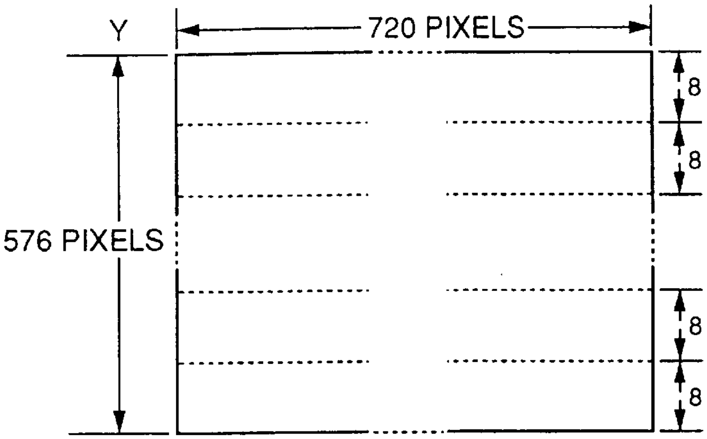
FIGS. 23A to 23D are views showing the arrangement of pixels.

First, in the case of the luminance signal Y whose effective pixel number in a horizontal direction is 720, and effective line number in a vertical direction in one frame is 576, as shown in FIG. 23A, 576 lines from the line at the uppermost end (the first line) of the image plane to the line at the lowest end (the 576th line) of the image plane are divided per continuous 8 lines to compose 72 groups of pixels. The pixel group positioned at the upper end of the image plane is called the first pixel group, the pixel group provided below the first pixel group is called second pixel group, and so on to the 72nd pixel group. The pixel division section 25 operates such that the odd-number unit pixel groups are supplied to the recording signal processing section 26 and the even-number pixel groups are supplied to the second recording signal processing section 27.

Figure 23B:
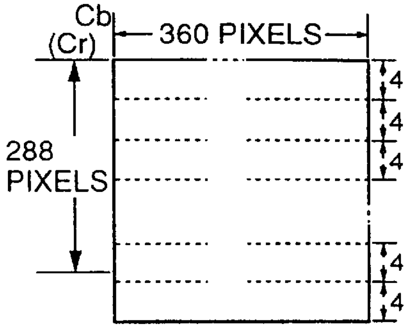
Figure 23C:
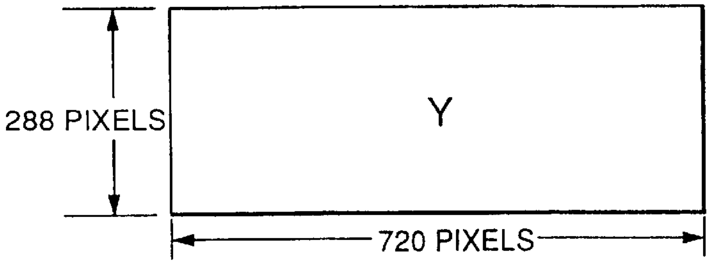

FIG. 23C schematically shows the imaginary image plane of the frame data supplied from the section 25 to the first and the second sections 26 and 27, that is, schematically shows one of two imaginary image planes in the same mode of pixel arrangement obtained by dividing the pixels of one image plane of the luminance signal Y shown in FIG. 23A into two by the pixel division section 25.

In the case where the chrominance signal Cb (or Cr) supplied from the thinning-out section 3 to the pix el division section 25 is that the effective pixel number in a horizontal direction is 360 and the effective line number in a vertical direction is 288, the section 25 divides, by continuous four lines, 288 lines from the line at the uppermost end of the image plane (the first line) to the line at the lowest end of the image plane (the 288th line). And, 72 pixel groups are constituted by pixels present per four continuous lines. With respect to 72 pixel groups constituted in one image plane, the pixel group positioned at the upper end of the frame is called the first pixel group, the pixel group provided below the first pixel group is called the second pixel group, and so on to the 72nd unit pixel group. The section 25 operates such that the odd-number pixel groups are supplied to the recording signal processing section 26 and the even-number unit pixel groups are supplied to the second recording signal processing section 27.

Figure 23D:
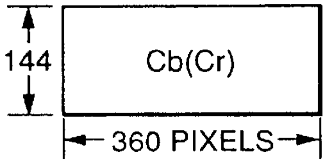

FIG. 23D schematically shows the imaginary image plane of the image plane data supplied from the image division section 25 to the first and the second sections 26 and 27. That is, FIG. 23D schematically shows one of two imaginary image planes in the same pixel arrangement obtained by dividing the pixels of one image plane of the chrominance signal Cb (or Cr) shown in FIG. 23B into two by the division operation of the section 25. The division operations of pixels with respect to two chrominance signals Cb and Cr are individually carried out in the same way.

The first and the second recording signal processing sections 26 and 27 sequentially supplied with image plane data of one imaginary image plane as shown in FIGS. 23C and 23D from the pixel division section 25 have the same configuration. Further, the signal processing operations in the first and the second sections 26 and 27 are also the same. Therefore, in FIG. 22, only the concrete configuration of the first section 26 is shown.

The second section 27 is merely shown by one-dotted line. In the following description, the functions of the first and the second sections 26 and 27 will be explained by taking the first section 26 only.

The luminance signal Y (image plane data of the imaginary image plane of the luminance signal Y) out of the video signal supplied from the pixel division section 25 to the recording signal processing section 26 is supplied to the row/column replacing section 28 in the section 26. The luminance signal Y is frame data of the imaginary frame of the luminance signal Y as shown in FIG. 23C. The section 28 divides the image plane data supplied thereto into pixel blocks of horizontal 8 pixels×vertical 8 pixels. In the case where the image plane data is of the odd-number image plane, the blocks of horizontal 8 pixels×vertical 8 pixels are also supplied to the longitudinal-lateral correlation comparison section 50.

The section 50 compares the longitudinal correlation with the lateral correlation in pixel block unit of horizontal 8 pixels×vertical 8 pixels are also supplied thereto. In the comparison, the pixel block of horizontal 8 pixels×vertical 8 pixels is divided into four small blocks of horizontal 4 pixels×vertical 4 pixels. An average value Aul of a pixel value of the small block at the left and upper part in the four small blocks and an average value Aur of a pixel value of the small block at the right and upper part, and an average value Adr of a pixel value of the small block at the right and lower part are obtained. After that an absolute value RH which is a difference between the average values Aur and Aul, and an absolute value RV which is a difference between the average values Aur and Adr are obtained. If the result of comparison between RH RV is RV>RH, judgement is made that the lateral correlation degree is high, and if the result of comparison between RH and RV is RV≦RH, judgement is made that the longitudinal correlation degree is high. Information of the result of comparison is supplied to the row/column replacing section 28.

In the case where the result of comparison is RV≦RH, that is, the longitudinal correlation degree is high, the section 28 carries out the row/column replacement with respect to the arrangement of pixels of the pixel block of horizontal 8 pixels×vertical 8 pixels in the luminance signal Y (image plane data of the imaginary image plane of the luminance signal Y) out of the video signal supplied from the pixel division section 25 to the row/column replacing section 28. The pixel arrangement shown in FIG. 19A and that shown in FIG. 19B illustrate the state of replacing between row and column of the pixel arrangement.

In the row/column replacing section 28, information of the state whether or not the replacement between row and column is done (which is the same as the state in which the result of comparison between RH RV is RV>RH or RV≦RH), is supplied from the section 28 to the memory 29 for storing results of comparison. This information is also supplied to the flag setting section 34.

In the case where the luminance signal Y out of the video signal supplied from the pixel division section 25 to the row/column replacing section 28 is the image plane data of the even-number image plane, the result of comparison between longitudinal and lateral correlations with respect to the pixel block of horizontal 8 pixels and vertical 8 pixels in the same position in the odd-number image plane immediately before the even-number image plane is read from the memory 29.

When the value of the result of comparison between longitudinal and lateral correlations is high in longitudinal correlation degree, the replacement between row and column is carried out in connection with the pixel arrangement of the pixel block of horizontal 8 pixels×vertical 8 pixels in the luminance signal Y out of the video signal supplied from the pixel division section 25 to the row/column replacing section 28.

The image plane data of each image plane of the luminance signal output from the section 28 is supplied to the frame constituting section 31 with the interlaced scanning of 2:1, and the image plane data of the imaginary image plane as shown in FIG. 23D of one of two imaginary image planes of the chrominance signals Cb and Cr output from the pixel division section 25 is supplied to the frame constituting section 31. The section 31 uses sequential data of the luminance signal Y in the odd- and even-number image planes of horizontal 720 pixels×vertical 288 pixels as shown in FIG. 23C as data of the luminance signal Y of the imaginary odd- and even-number fields to generate data so as to compose an imaginary image planes of the luminance signal Y of horizontal 720 pixels×vertical 576 pixels in which the line of the i-th (i=1, 2, 3) of the image plane of the imaginary even-number field is provided next to the line of the i-th (i=1, 2, 3) of the frame of the imaginary odd-number field. The generated data is supplied to the DCT block forming LSI 32 of the DVC 625/50 system.

Further, the frame constituting section 31 uses image plane data of one imaginary image plane of the chrominance signal Cb (or Cr) output from the pixel division section 25, that is, data of the chrominance signal Cb (or Cr) in the odd- and even-number image planes of horizontal 360 pixels× vertical 144 pixels as shown in FIG. 23D as data of the chrominance signal Cb (or Cr) of the imaginary odd- and even-number fields generate data so as to compose an imaginary image plane of the chrominance signal Cb (or cr) of horizontal 360 pixels×vertical 288 pixels in which the line of the i-th (i=1, 2, 3) of the frame of the imaginary even-number field is provided next to the line of the i-th (i=1, 2, 3) of the image plane of the imaginary odd-number field. The generated data is supplied to the DCT block forming LSI 32 of the DVC 625/50 system.

The image plane data of the odd- and eve-number fields constituting the frame data of one frame by the interlaced scanning system of 2:1 supplied from the frame constituting section 31 to the block forming LSI 32 are obtained on the basis of the odd- and even-number image plane data in the continuous video signal by the sequential scanning system.

Pixels of the luminance signal Y in one image plane are in the form of a data train corresponding to the frame of horizontal 720 pixels and vertical 576 pixels. And, with respect to the chrominance signals Cb and Cr, pixels in one image plane are in the form of a data train corresponding to the image plane of horizontal 360 pixels and vertical 288 pixels. Then, a data train of signals of 4:2:0 type is composed by these data trains. Therefore, the data train can be subjected to various signal processing using a large scale integrated circuit (LSI) for DVC 625/50 system heretofore used for various signal processing in VCR in accordance with DVC Standards of 625/50 system.

Figure 1B:
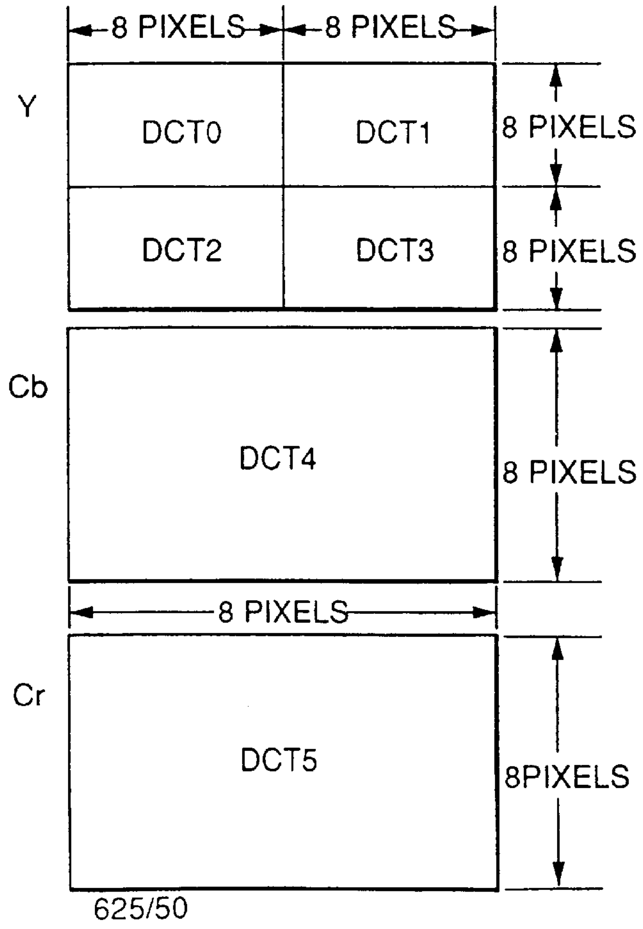

The block forming LSI 32 supplied with the data train of signals of 4:2:0 type from the frame constituting section 31 forms macro blocks constructed as shown in FIG. 1B, that is, DCT blocks DCT0 to DCT3 having the block size of horizontal 8 pixels×vertical 8 pixels with respect to the luminance signal Y, and DCT blocks DCT4 and DCT5 having the block size of horizontal 8 pixels×vertical 8 pixels with respect to the chrominance signals Cb and Cr. Each macro block is of the type in accordance with the DVC Standards. And, the data train output from the LSI 32 is supplied to LSI 33 for DCT operation of DVC.

The LSI 33 performs the arithmetic operation in a predetermined mode for obtaining the sum and the difference of the DCT coefficient obtained per DCT block after the completion of DCT operation per DCT block of horizontal 8 pixels×vertical 4 pixels obtained by dividing the pixel block of horizontal 8 pixels×vertical 8 pixels by fields of PAL system. The arithmetic operation mode can be set at a DCT mode setting terminal provided as one of input terminals in the LSI33.

In the frame constituting section 31, the DCT operation by the LSI 33 is carried out with respect to frame data of PAL system according to the 2:1 interlaced scanning system constructed such that data of the luminance signal Y in the odd- and even-number frames of horizontal 720 pixels× vertical 288 pixels as shown in FIG. 23C sequentially supplied are used as data of the luminance signals Y of the imaginary odd- and even-number fields, respectively. This DCT operation corresponds to the 3-dimensional DCT of horizontal 8 pixels×vertical 4 pixels×time 2 pixels because pixel data taken from the odd-number frame according to the sequential scanning corresponds to pixel data taken from the even-number frame according to the sequential scanning following the odd-number frame.

Further, in the case where with respect to the luminance signal Y, judgement is made by the longitudinal-lateral correlation comparison section 5 that the longitudinal correlation degree is large, the row is replaced by the column in the pixel arrangement by the row/column replacing section 28 and thereafter, the signal is input to the DCT block forming LSI 32. Therefore, in terms of an input signal, the arithmetic operations by the LSI 33 corresponds to the 3-dimensional DCT of horizontal 8 pixels×vertical 4 pixels× time 2 pixels was carried out.

A flag M indicative of discrimination of operating modes of the LSI 33 in addition to DCT operation coefficients obtained by the DCT operation are output form the LSI 33, and the flag M is supplied to a flag setting section 34.

The LSI 33 has two arithmetic operating modes, i.e., the DCT arithmetic operating mode for carrying out the DCT operation with respect to the DCT block of horizontal 8 pixels×vertical 8 pixels, and the DCT arithmetic mode for obtaining the sum of and the difference between the DCT coefficients obtained per DCT block after the completion of DCT operation per DCT block of horizontal 8 pixels× vertical 4 pixels obtained by dividing the pixel block of horizontal 8 pixels×vertical 8 pixels by fields. Thus, the flag for discriminating if the LSI 33 carries out the DCT arithmetic operation to output DCT coefficients in either of the two operating modes is also output from the LSI 33.

The flag setting section 34 extracts the flag, which is replaced by the result of comparison by the longitudinal-lateral correlation comparison section 5 supplied from the row/column replacing section 28 to the flag setting section 34. No operation is carried out by the section 34 with respect to the DCT blocks of the chrominance signals Cb and Cr.

The output of the flag setting section 34 is subjected to the variable-length coding after the amount of data of the variable-length coded-data is quantized so as to have a predetermined data amount within a video segment by the LSI 35 for quantization of DVC and for variable-length coding.

Figure 3A:
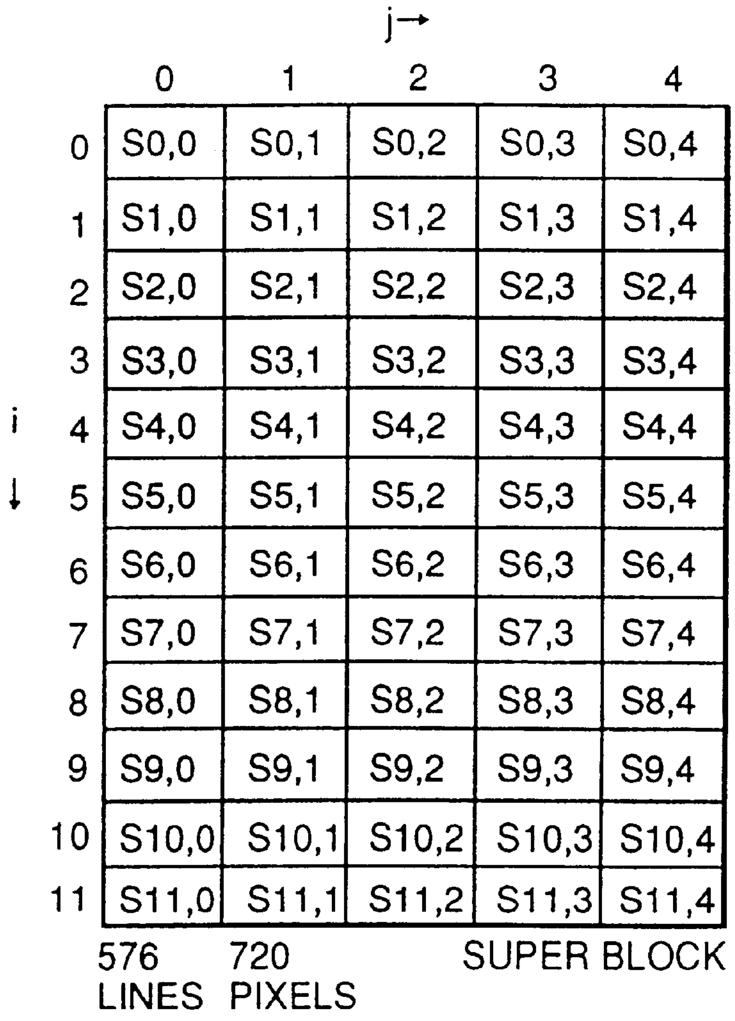
FIGS. 3A and 3B are views showing an example of constitution of super blocks.
Figure 3B:
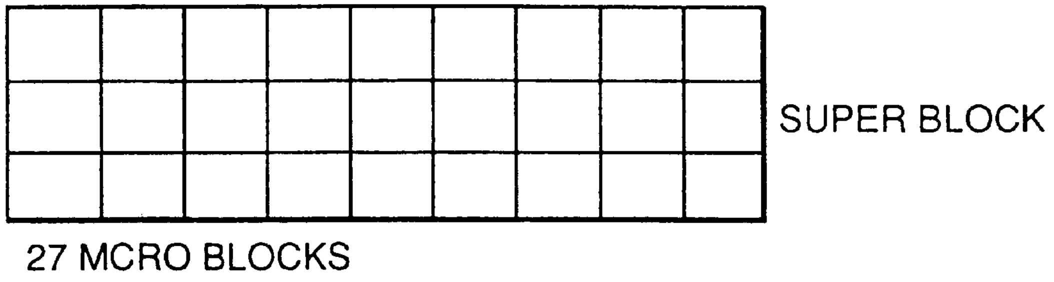

The video segment is composed of five macro blocks as described above. That is, as shown in FIG. 3A, one video segment is constituted by: dividing one frame into 45 super blocks, each composed of 27 macro blocks S0, 0 SO, 1, S0, 2, . . . , S11, 2, S11, 3, S11 and 4, selecting one super block per column in 60 super blocks constituted in one frame, and taking the macro blocks one by one per selected super block to obtain 5 macro blocks.

The variable length coded-data is subjected to formatting as data in the sync block shown in FIG. 4. And, a DC component of the DCT coefficients obtained with respect to DCT blocks DCT0 to DCT5 constituting the macro block shown in FIG. 1B is stored in the DC storage region in the sync block. Here, the DCT operation is carried out to obtain the sum of and the difference between the DCT coefficients obtained per DCT block after the DCT operation is carried out per DCT block of horizontal 8 pixels×vertical 4 pixels. In this case, the component of the sum of the DC DCT coefficients is stored in the DC storage region. Further, AC components of the DCT coefficients obtained with respect to the DCT blocks DCT0 to DCT5 constituting the macro block are stored in the AC storage region in the same sync block as the sync block in which are stored the DC components. In the case where the data amount of AC components of the DCT coefficients is larger than the memory capacity of the storage region, they are stored in a vacant AC storage region in the sync block or a vacant AC storage region in the same video segment.

The formatted data is then input to the error correction coding LSI 36 of DVC. Incidentally, data of five super blocks aligned in one row shown in FIGS. 2A and 2B constitute data of one video sector. The LSI 36 carries out the outer correction coding with respect to data of the one video sector. Further, data of each sync block is subjected to the inner correction coding. Data output from the LSI 36 is supplied to the modulation section (modulating LSI) 10.

The section 10 supplied with data from the LSI 36 adds an ID word and a sync word to the data and thereafter applies modulation thereto to supply them as recording data to the rotary magnetic head. Data for one frame are recorded on the magnetic tape by the rotary magnetic head so that they are recorded on 12 recording tracks.

The recording data supplied from the modulation section 10 to the rotary magnetic head are in the data arrangement such that recording data corresponding to data supplied to the section 10 from the LSI 36 provided in the recording signal processing section 26 are recorded in the first half portion of each recording track, and recording data corresponding to data supplied to the section 10 from the error correction coding LSI 36 of DVC provided on the recording signal processing section 27 are recorded in the second half portion of each recording track.

The signal processing with respect to data reproduced by the rotary magnetic head from the recorded magnetic tape in which the recording data is recorded by the recording system described with reference to FIG. 22 is carried out by the reproducing system shown in FIG. 24.

The data reproduced by the rotary magnetic head from the magnetic tape is supplied to the demodulation section (demodulating LSI) 13 via terminal 12. The data reproduced from the first half portion of each recording track is supplied to the first reproduced signal processing section 37, and the data reproduced from the latter half portion of each track is supplied to the second reproduced signal processing section 38.

The first and the second sections 37 and 38 have the same configuration, and their signal processing operations are also the same. Therefore, in FIG. 24, only the concrete configuration of the first section 37 is shown. The second section 38 is merely indicated by one-dotted line. Reproduced data subjected to the signal processing by the first and the second sections 37 and 38 are data subjected to signal processing by the first and the second recording signal processing sections 26 and 27, respectively, used in the recording system of FIG. 22. In the following description, the contents of the first and second reproduced signal processing sections 37, 38 will be explained by taking the first section 37 only.

The error correction decoding LSI 39 of DVC of the reproduced signal processing section 37 supplied with reproduced data from the demodulation section 13 carries out the error correction processing to correct data errors mixed during reproduction. In the case where there is an error that cannot be corrected, it is corrected using data reproduced as data for the frame immediately before. The concrete correcting method that can be employed in the case where there is an error that cannot be corrected includes a method in which an error is replaced by data of the sync block for storing macro block data in the same position on the image plane of the previous frame. Output data from the LSI 39 are supplied to a variable length decoding/inverse-quantization LSI 40 of DVC. The LSI 40 decodes a variable-length code, with respect to data supplied thereto, and carries out the signal processing of inverse-quantization to supply it to a flag extraction section 41.

The section 41 extracts data of a flag M position, with respect to the DCT block of the luminance signal Y, to supply the data to a row/column return section 46. Further, the section 41 divides the flag M by field, carries out 8×4 DCT operation by the block of horizontal 8 pixels×vertical 4 pixels, and rewrites it to data indicative of the mode for obtaining the sum of and the difference between DCT coefficients. Nothing is done for the DCT block with respect to two chrominance signals Cb and Cr. Output from the section 41 is supplied to a next inverse-DCT operation LSI 42 of DVC.

In the LSI 42, since all the input flags M are data indicative of the mode in which the 8×4 DCT operation is carried out with horizontal 8 pixels×vertical 4 pixels by dividing them by fields and for obtaining the sum of and the difference between DCT coefficients, inverse-operation corresponding to this DCT operation is selected and executed. Output of the LSI 42 is supplied to the next pixel arranging LSI 43 of DVC. In the LSI 43, input data are made into image data composing a Y signal, and two chrominance signals Cb and Cr of one frame, which are supplied to a frame division section 44 for one frame division by interlaced scanning of 2:1.

The section 44 performs the signal processing reverse to the signal processing carried out by the frame constituting section 31 by the interlaced scanning of 2:1 used in the recording system described with reference to FIG. 22. That is, the section 44 divides input data into data of the odd-number imaginary image plane of horizontal 720 pixels× vertical 288 pixels of odd-number lines only and the even -number imaginary image plane of horizontal 720 pixels× vertical 288 pixels of even-number lines only, both as shown in FIG. 23C out of one imaginary image plane data of the luminance signal Y of horizontal 720 pixels×vertical 576 pixels as shown in FIG. 23A. The, the divided data are supplied to a row/column return section 46.

Further, the frame division section 44 divides, also with respect to the chrominance signal Cb (Cr), input data into the odd-number image plane data of horizontal 360 pixels× vertical 144 pixels of odd-number lines only and the even-number image plane data of horizontal 360 pixels×vertical 144 pixels of even-number lines only, both as shown in FIG. 23D out of one imaginary image plane data of the chrominance signal Cb (Cr) of horizontal 360 pixels×vertical 288 pixels. The divided data are then supplied to an image composing section 47.

The row/column return section 46, sequentially supplied from the frame division section 44 with the odd- and even-number frame data of the luminance signal Y, carries out the row/column replacing operation in the pixel arrangement referring to signals supplied from the flag extraction section 41 in unit of a pixel block of horizontal 8 pixels× vertical 8 pixels. That is, the row/column replacing operation in the pixel arrangement in unit of the pixel block of horizontal 8 pixels×vertical 8 pixels is carried out only with respect to the pixel block in which the row/column replacing operation is carried out due to the fact that the longitudinal correlation is larger than lateral correlation that is detected as the result of comparison between longitudinal and lateral correlations by the longitudinal-lateral correlation comparison section 50.

The image plane data of the luminance signal Y and the chrominance signals Cb and Cr output from the row/column return section 46 and the frame division section 44 provided in the first reproducing signal processing section 37, and the image plane data of the luminance signal Y and the chrominance signals Cb and Cr output from the corresponding sections provided in the second reproducing signal processing section 38 are all supplied to the pixel composing section 47.

The pixel section 47 carries out the signal processing operation reversed to that carried out by the pixel division section of FIG. 22. That is, in the section 47, the following signal processing operation is carried out. First, with respect to the luminance signal Y, pixels of a first 8 lines at the upper end of the image plane data output from the first reproducing signal processing section 37 are aligned, and then pixels of a second 8 lines at the upper end of the image plane data output from the second reproducing signal processing section 38 are aligned. Thereafter, pixels of a second 8 lines next to the first 8 lines at the upper end of the image plane data output from the first section 37 are aligned, and then pixels of a second 8 lines next to the first 8 lines at the upper end of the image plane data output from the second section 38 are arranged.

As describe above, the pixels of 8 lines in the image plane data with respect to the luminance signal Y output from the first section 37, and the pixels of 8 lines in the image plane data with respect to the luminance signal Y output from the second section 38 are sequentially and alternately arranged. The sequential arranging operation of pixels is repetitively carried out per line in the pixel composing section 37 whereby a digital luminance signal Y of horizontal 720 pixels and vertical 576 lines according to the sequential scanning system is delivered from the section 47 to the output terminal 20 corresponding to one image plane by the sequential scanning system in response to the frame data of the luminance signal Y supplied from the first and second sections 37 and 38.

In the signal processing operation in the pixel composing section 47 with respect to the chrominance signals Cb and Cr, the arranging operation of pixels carried out with respect to the chrominance signals Cb and Cr are separately carried out in the same way.

Thus, only the operation of the pixel composing section 47 with respect to the chrominance signal Cb will be explained. First, pixels of a first 4 lines at the upper end of the image plane data with respect to the chrominance signal Cb output from the first reproducing signal processing section 37 are aligned, and then pixels of a first 4 lines at the upper end of the image plane data with respect to the chrominance signal Cb output from the second reproducing signal processing section 38 are aligned. Thereafter, pixels of a second 4 lines next to the first 8 lines in the image plane data with respect to the chrominance signal Cb output from the first section 37 are aligned, and then pixels of a second 4 lines next to the first 4 lines in the image plane data with respect to the chrominance signal Cb output from the second section 38 are aligned.

As described above, the pixels of 4 lines in the image plane data with respect to the chrominance signal Cb output from the first section 37, and the pixels of 4 lines in the image plane data with respect to the chrominance signal Cb output from the second section 38 are sequentially and alternately arranged. The sequential arranging operation of pixels is repetitively carried out per line in the pixel composing section 47 whereby digital chrominance signals Cb and Cr of horizontal 360 pixels and vertical 288 lines are output from the section 47 and supplied to the line interpolation section 19. In the section 19, interpolation is made so that the number of lines is doubled. Data of the chrominance signals Cb and Cr of horizontal 360 pixels×vertical 576 pixels according to the sequential scanning system are delivered to the output terminal 21.

While in the recording and reproducing apparatus for digital image information shown in FIGS. 15 and 22, the frame composing section 31 according to the interlaced scanning of 2:1 is constituted separately from the DCT block forming LSI 32 of DVC. However, it is to be noted that in the case where there is provided the function that as the LSI 32 used, two field image planes for the interlaced scanning can be gathered in the LSI 32 to compose one frame, the frame composing section 31 need not be provided separately from the LSI 32.

Figure 16:
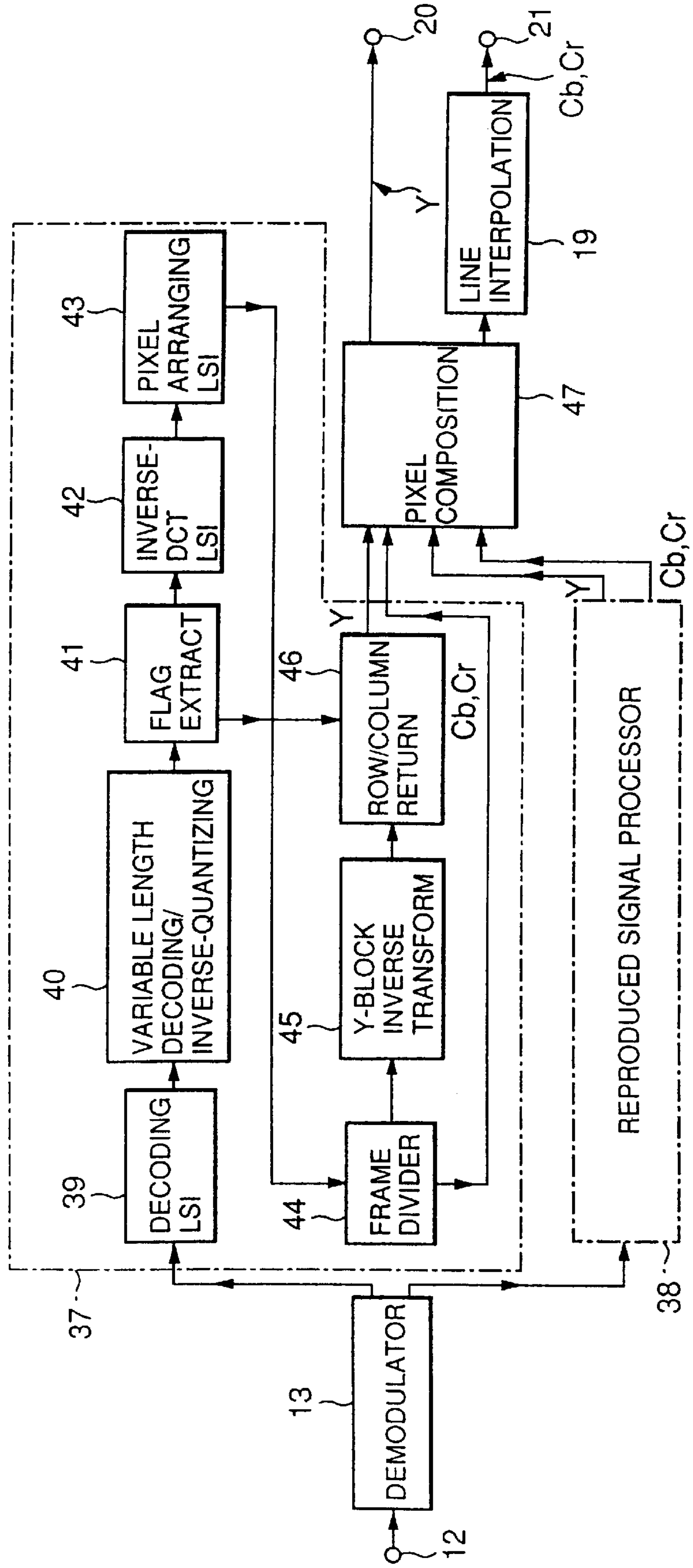
FIG. 16 is a block diagram of the third embodiment of a reproducing system of the recording and reproducing apparatus for digital image information according to the present invention.
Figure 24:
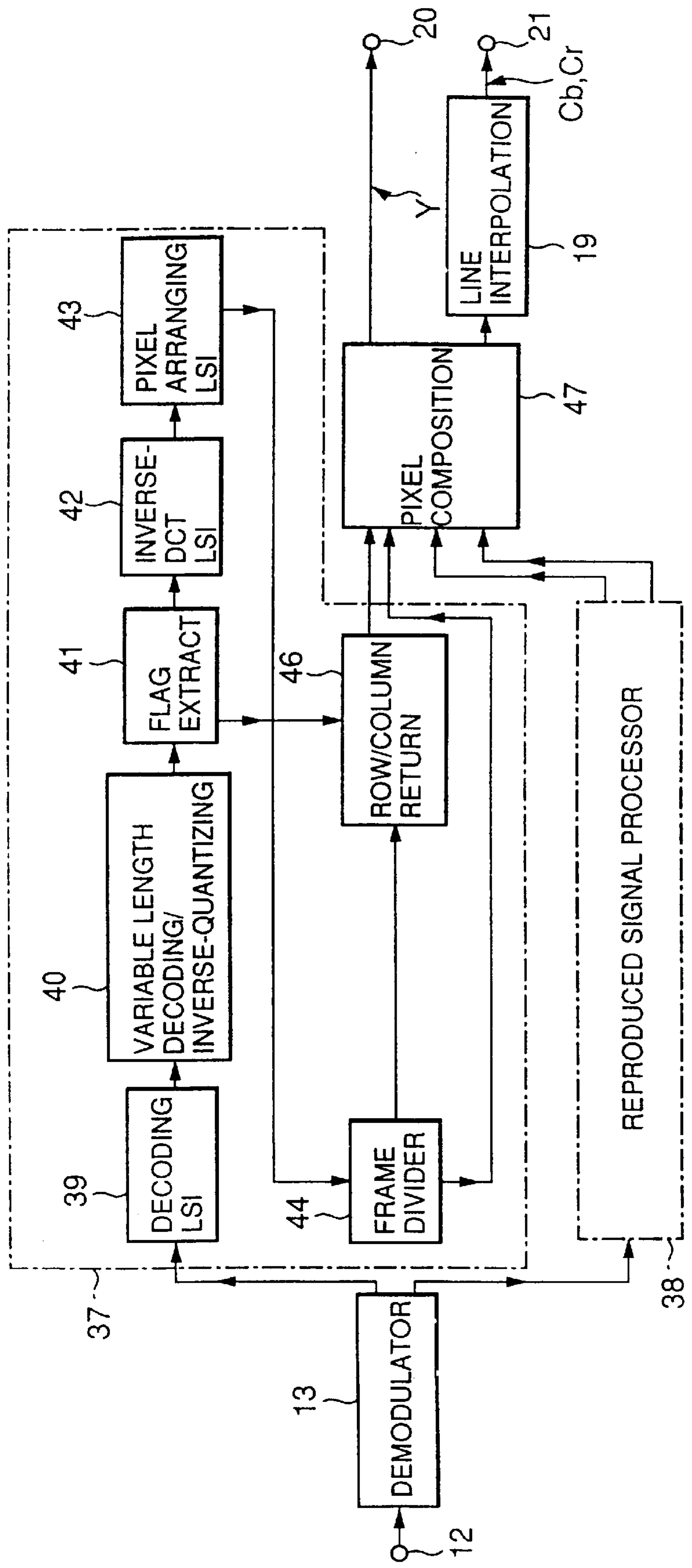
FIG. 24 is a block diagram of the fourth embodiment of a reproducing system of the recording and reproducing apparatus for digital image information according to the present invention.

Further, while in the recording and reproducing apparatus for digital image information shown in FIGS. 16 and 24, the frame division section 44 according to the interlaced scanning of 2:1 is constituted separately from the pixel arranging LSI 43 of DVC. However, it is to be noted that in the case where there is provided the function that as the LSI 43 used, one frame can be divided into two field image planes of the interlaced scanning and output in the LSI 43, the section 44 need not be provided separately from the LSI 43.

Furthermore, while in the recording and reproducing apparatus for digital image information according to the present invention so far described, when the number of lines is thinned out, with respect to two chrominance signals Cb and Cr in video signal according to the sequential scanning system, the same line is thinned out in any image plane. It is to be noted that in practice, the odd-number line may be thinned out in the odd-number image plane and the even-number line may be thinned out in the even-number image plane. As a result, with respect to the chrominance signal, the line arrangement like the interlaced scanning is employed. In this case, with respect to the chrominance signal, the original operation of the LSI 33 for DCT operation may be carried instead of setting on a DCT mode setting terminal of the LSI 33 is not made. That is, the DCT transform with horizontal 8 pixels×vertical 8 pixels and the operation for obtaining the sum of and difference between DCT coefficients after completion of the DCT operation of horizontal 8 pixels×vertical 4 pixels divided by fields are adaptively carried out.

Further, as the DCT block forming LSI of DVC, the LSI for DCT operation of DVC, the LSI for quantization of DVC and variable length coding, the error correction coding LSI of DVC, the LSI for error correction decoding of DVC, LSI for variable length decoding/inverse-quantization of DVC, the inverse-DCT operation LSI of DVC, the pixel arranging LSI of DVC and the large scale integrated circuit constituted by suitably combining the desired large scale integrated circuits used in the recording and reproducing apparatus for digital image information according to the present invention so far described, those which are relatively inexpensive and reliable used for the recording and reproducing apparatus in accordance with the DVC Standards can be used without modification.

Examples of the large scale integrated circuit constituted by suitably combining the desired large scale integrated circuits include, for example, LSI in which the DCT block forming LSI of DVC and the LSI for DCT operation of DVC are integrated into a single LSI, or for example, LSI in which the LSI for quantization of DVC and variable length coding and the error correction coding LSI of DVC are integrated into a single LSI, LSI in which the LSI for error correction decoding of DVC and the LSI for variable length decoding/inverse-quantization of DVC, and LSI in which the inverse-DCT operation LSI of DVC and the pixel arranging LSI of DVC are integrated into a single LSI.

Further, in the recording and reproducing apparatus for digital image information according to the present invention, the apparatus may not be provided with the row/column replacing section 28, the longitudinal-lateral correlation comparison section 5 (50), the memory 29 for storing results of comparison, the flag setting section 34 and the row/column return section 46. The DCT operation without those sections corresponds to the 3-dimensional DCT of horizontal 8 pixels×vertical 4 pixels×time 2 pixels.

Alternatively, the present invention can be carried out under the conditions that only the row/column replacing section 28 and the row/column return section 46 are provided and the signal processing operation is always carried out so that the arrangement of horizontal pixels within the pixel block of horizontal 8 pixels×vertical 8 pixels shown in FIG. 19A is changed to the arrangement of vertical pixels as in the pixel arrangement shown in FIG. 19B, as a consequence of which the 3-dimensional DCT operation of horizontal 4 pixels×vertical 8 pixels×time 2 pixels is carried out.

In the recording and reproducing apparatus for digital image information according to the present invention described with reference to FIG. 15, every 16 pixels for the luminance signal Y, and every 8 pixels for two chrominance signals Cb and Cr are basically assigned in a horizontal direction to the recording signal processing sections 26 and 27 of DVC so that in the sections 26 and 27, pixel data assigned from one image plane data according to the sequential scanning are handled as pixel data composing the image plane of fields according to the interlaced scanning of 2:1; and the operating mode of the LSI for DCT operation of DVC is divided by fields to carry out the 8×4 DCT operation with horizontal 8 pixels×vertical 4 pixels and to fix to the mode for obtaining the sum of and difference between DCT coefficients. Therefore, the horizontal 8 pixels when DCT operation is carried out are adjacent 8 pixels even in the stage of input signal, and the vertical 4 pixels when DCT operation is carried out are adjacent 4 pixels even in the stage of input signal. Further, obtaining the sum of and the difference between DCT coefficients corresponds to carrying out DCT operation with adjacent two pixels in the direction of time. However, since the adjacent 2 pixels in the direction of time are also two pixels communicated in terms of time even in stage of input signal, it is possible to successfully utilize the correlation between the pixels in terms of space and time.

Accordingly, the quantized noise when image information is compressed to a fixed bit amount becomes small, and the deterioration in quality at the time of expansion can be suppressed. Further, the large scale integrated circuit (LSI) for DVC which is a digital VTR for public use is available at a low price due to the effect of mass production. Therefore, the recording and reproducing apparatus for digital image information according to the present invention provided with a signal processing section of the type in which an LSI for DVC is used for a main constitutional portion and a peripheral circuit is added thereto can be provided easily as the apparatus which is low in cost and high in reliability. Further, since the input signals which are the pixel data train scanned in a horizontal direction can be assigned per horizontal 16 pixels to two recording signal processing sections 26 and 27 sequentially and alternately, a memory having a small capacity required to synchronize the sections 26 and 27 can be used, thus enabling the reduction in cost.

In the recording and reproducing apparatus for digital image information according to the present invention described with reference to FIG. 15, in the Y block transform section 30, the pixel block of horizontal 16 pixels×vertical 8 pixels is divided into four blocks BL1, BL2, BL3 and BL4 of horizontal 8 pixels×vertical 4 pixels as shown in FIG. 20A, and the four blocks BL1, BL2, BL3 and BL4 are re-arranged as shown in FIG. 20B whereby the imaginary image plane of the luminance signal Y shown as horizontal 360 pixels×vertical 480 pixels is converted into the imaginary image plane of the luminance signal Y shown as horizontal 720 pixels×vertical 240 pixels to generate the image plane data of one field of the luminance signal Y of the 2:1 interlaced scanning system. The generated data is supplied to the signal processing LSI of DVC.

In the signal processing LSI of DVC, a macro block as shown in FIG. 1A is composed of one DCT block of horizontal 8 pixels×vertical 8 pixels in one frame with respect to chrominance signals Cb and Cr, and four blocks laterally arranged corresponding to the same size as the former on the image plane with respect to the luminance signal Y.

The aforementioned processing is carried out in the state in which the luminance signal Y and two chrominance signals Cb, Cr are so-called 4:2:0, which are input in the signal processing LSI of DVC prepared so as to process input signals of originally so-called 4:1:1.

Figure 25A:
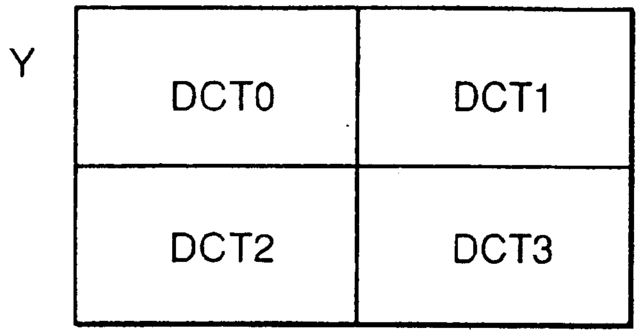
FIGS. 25A to 25C are views showing an example of constitution of macro blocks.
Figure 25B:
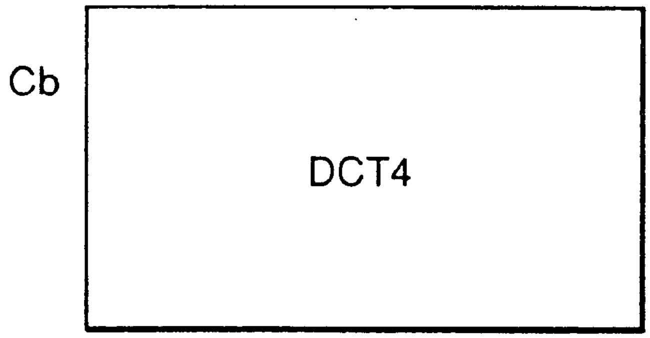
Figure 25C:
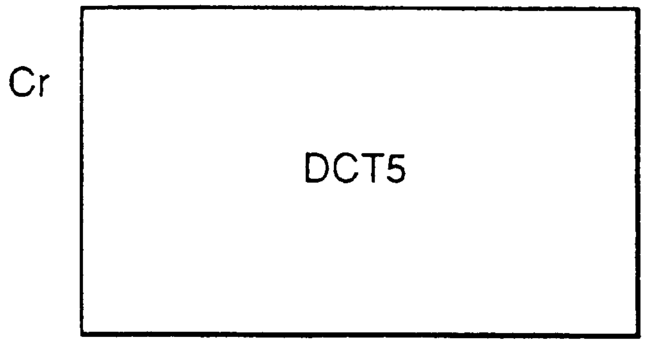

Then, a macro block interiorly of the signal processing LSI of DVC is constituted, in input signals of so-called 4:2:0, by a set of DCT blocks DCT4 and DCT5 of two chrominance signals Cb and Cr as shown in FIGS. 25A to 25C and DCT blocks DCT0 to DCT3 of the luminance signal Y arranged every two longitudinally and laterally corresponding to the same size as the former on the image plane.

In the macro block, in the case where data in one sync block is composed from at least lower DCT transform coefficient data in DCT blocks composing the macro block, and an error in data mixed when in reproduction cannot be corrected, data of the sync block for storing macro block data in the same position on the image plane of the front frame has a replacing unit. Since an error in data that cannot be corrected is normally within a period of one sync block, if the macro block is composed of pixel blocks of the luminance signal Y and two chrominance signals in the same position and of the same size on the image plane, the range replaced by the data of the front frame is minimum, and the deterioration of quality at the time of reproduction can be minimized.

With respect to the re-arrangement of four blocks BL1, BL2, BL3 and BL4 in the Y block transform section, the arrangement as shown in FIG. 20B is not employed but for example, the arrangement of BL1, BL3, BL2 and BL4 from left is employed. Even so, since the pixels constituting the macro block are the same, the deterioration of quality at the time of reproduction can be likewise suppressed.

In the recording and reproducing apparatus for digital image information according to the present invention described with reference to FIG. 15, the row/column replacing section 28 and the longitudinal-lateral correlation comparison section 50 are provided so that the longitudinal correlation degree and the lateral correlation degree within the pixel block of horizontal 8 pixels×vertical 8 pixels are compared with each other. In the case where the longitudinal correlation is larger than the lateral correlation, the section 28 carries out the signal processing operation in which the arrangement of horizontal pixels in the pixel block of horizontal 8 pixels×vertical 8 pixels shown in FIG. 19A is changed to the arrangement of vertical pixels as in the pixel arrangement shown in FIG. 19B so that the 3-dimensional DCT operation of horizontal 8 pixels×vertical 4 pixels×time 2 pixels and the 3-dimensional DCT operation of horizontal 4 pixels×vertical 8 pixels×time 2 pixels can be carried out adaptively using the LSI for DVC. Therefore, it is possible to achieve an image information compression, recording and reproducing apparatus which is relatively low in cost and can successfully utilize the correlation of video signals.

In the recording and reproducing apparatus for digital image information according to the present invention described with reference to FIG. 22, every eight lines for the luminance signal Y, and every four lines for two chrominance signals Cb and Cr are assigned to the recording signal processing sections 26 and 27 of DVC so that in the sections 26 and 27, pixel data assigned from the one image plane data according to the sequential scanning are handled as pixel data composing the image plane of each field according to the interlaced scanning of 2:1. The image plane data of the imaginary image plane of one frame are composed of 2 fields and supplied to the signal processing LSI of DVC of the PAL system. In the signal processing LSI of DVC of the PAL system, the macro block as shown in FIG. 1B is composed of one DCT block of horizontal 8 pixels×vertical 8 pixels within one frame for two chrominance signal Cb (or Cr), and four such blocks with two in horizontal and two in vertical arranged corresponding to the same size as the former on the image plane for the luminance signal Y. The pixels in each DCT block are pixels adjacent to each other also in input signal. Accordingly, the correlation between pixels is high, and the image information amount can be efficiently compressed by DCT.

Further, the macro block will be a DCT block of two chrominance signals Cb and Cr of input signals, and every two DCT blocks for horizontal and vertical of the luminance signal Y corresponding to the same size as the former on the image plane. In the macro block, data in one sync block is composed of at least the lower DCT transform coefficient data in each DCT block composing the macro block. In the case where an error in data mixed at the time reproduction cannot be corrected, data of the sync block in which macro block data in the same position in the image plane of the front frame is stored is a replacing unit. Since an error in data that cannot be corrected is normally within a period of 1 sink block, if the macro block is composed of pixel blocks of the luminance signal Y and two chrominance signals Cb and Cr in the same position and of the same size on the image plane, the range replaced by data of the front frame is minimum, and the deterioration of quality at the time of reproduction can be minimized.

In the recording and reproducing apparatus for digital image information according to the present invention described with reference to FIG. 22, the row/column replacing section 28 and the longitudinal-lateral correlation comparison section 50 are provided so that the longitudinal correlation degree and the lateral correlation degree within the pixel block of horizontal 8 pixels×vertical 8 pixels are compared with each other. In the case where the longitudinal correlation is larger than the lateral correlation, the section 28 carries out the signal processing operation in which the arrangement of horizontal pixels in the pixel block of horizontal 8 pixels×vertical 8 pixels shown in FIG. 19A is changed to the arrangement of vertical pixels as in the pixel arrangement shown in FIG. 19B so that the 3-dimensional DCT of horizontal 8 pixels×vertical 4 pixels×time 2 pixels and the 3-dimensional DCT operation of horizontal 4 pixels×vertical 8 pixels×time 2 pixels can be carried out adaptively using the LSI for DVC. Therefore, it is possible to achieve an image information compression, recording and reproducing apparatus which is relatively low in cost and can successfully utilize the correlation of video signals.

As will be apparent from the foregoing, in the recording and reproducing apparatus for digital image information according to the present invention, DCT operation is carried out making use of higher correlations in a horizontal direction and in a vertical direction in the image plane and the correlation in the direction of time. It is therefore to enable the efficient image information compression coding, and in the case where the bit rate recorded in the recording medium is fixed, the quantized noise caused by re-quantization can be reduced. An improvement in quality at the time of compression and expansion can be achieved. The correlation of pixels in the direction of time can be utilized more effectively with respect to the images obtained in the state in which the image pickup device (TV camera) has panned to obtain easily a compressed and expanded image of higher quality. Further, as the LSI for DCT operation of DVC, the LSI for quantization of DVC and variable length coding, the error correction coding LSI of DVC, the LSI for error correction decoding of DVC, LSI for variable length decoding/inverse-quantization of DVC, the inverse-DCT operation LSI of DVC, the pixel arranging LSI of DVC and the large scale integrated circuit constituted by suitably combining the desired large scale integrated circuits in carrying out the present invention, those which are used for the recording and reproducing in accordance with the DVC Standards and are relatively inexpensive can be used without modification. Therefore, it is possible to provide a recording and reproducing apparatus for digital image information capable of recording and reproducing a moving image and a static image simultaneously, at low cost and easily.

What is claimed is:

1. A recording apparatus comprising:

a divider to divide each of main pixel blocks of m pixels in a horizontal direction×m pixels in a vertical direction×n pixels in a time direction included in a video signal into a first block of m/2 pixels in the horizontal direction×m pixels in the vertical direction×n pixels in the time direction and a second block of m pixels in the horizontal direction×m/2 pixels in the vertical direction×n pixels in the time direction, m and n being an integer;

a detector to detect correlation between pixels in each main pixel block in the horizontal and vertical directions and correlation between continuous two main pixel blocks in the horizontal and vertical directions;

an orthogonal transformer to apply three-dimensional orthogonal transform to either of the first or the second block according to the detected correlation by adaptively switching an orthogonal transforming mode between a first mode for transforming the first block and a second mode for transforming the second block, and to output mode data indicating the first or the second mode being adaptively switched; and a coder to encode the video signal, the first or the second block thereof being applied with the three-dimensional orthogonal transform and the mode data to form a signal to be recorded.

2. The apparatus of claim 1 further comprising a motion detector to detect motion vectors by means of pixel data of continuous main blocks, the orthogonal transformer applying the three-dimensional orthogonal transform to the first or the second block according to the detected motion vectors.

3. A recording apparatus comprising:

a divider to divide sequential pixels included in at least one pixel block of frame data of a video signal composed by sequential scanning into a plurality of main groups, the main groups being distributed into a first sub group of field data and a second sub group of field data so that odd-number groups of the main groups are sequentially distributed into the first sub group and even-number groups of the main groups are sequentially distributed into the second sub group;

a detector to detect correlation with respect to the pixels, in a horizontal direction and a vertical direction, of the main groups distributed into the first and second sub groups separately;

a pixel arranger to arrange the pixels of each main group in a predetermined arrangement order according to the detected correlation separately with respect to the first and the second sub groups of field data;

a frame generator, in response to the main groups in which the pixels are arranged, to generate a plurality of frames of pixels by interlaced scanning, separately with respect to the first and the second sub groups of field data;

a block generator to generate a plurality of first blocks of m pixels in a horizontal direction×m pixels in a vertical direction per frame, m being an integer, separately with respect to the first and the second sub groups;

an orthogonal transformer to selectively apply a first orthogonal transform to the first blocks and a second transform to second blocks of m pixels in the horizontal direction×m/2 pixels in the vertical direction obtained by means of the first blocks to obtain an addition of and a difference between the results of the second transform in each second block, separately with respect to the first and the second sub groups, and to output mode data indicating which of the first or the second orthogonal transform is applied; and a coder to encode the video signal with reference to the mode data, the blocks thereof being selectively applied with the first and the second transform, together with respect to the first and the second sub groups, to form a signal to be recorded.

4. A recording and reproducing apparatus comprising:

a divider to divide each of main pixel blocks of m pixels in a horizontal direction×m pixels in a vertical direction×n pixels in a time direction included in a video signal into a first block of m/2 pixels in the horizontal direction×m pixels in the vertical direction×n pixels in the time direction and a second block of m pixels in the horizontal direction×m/2 pixels in the vertical direction×n pixels in the time direction, m and n being an integer;

a detector to detect correlation between pixels in each main pixel block in the horizontal and vertical directions and correlation between continuous two main pixel blocks in the horizontal and vertical directions;

an orthogonal transformer to apply three-dimensional orthogonal transform to either of the first or the second block according to the detected correlation by adaptively switching an orthogonal transforming mode between a first mode for transforming the first block and a second mode for transforming the second block, and to output mode data indicating the first or the second mode being adaptively switched;

a coder to encode the video signal, the first or the second block thereof being applied with the three-dimensional orthogonal transform and the mode data to form a signal to be recorded;

a decoder to decode the formed signal; and an inverse-orthogonal transformer, with reference to the mode data, to apply three-dimensional inverse-orthogonal transform to the first or the second block to which the three-dimensional orthogonal transform is applied, the three-dimensional inverse-orthogonal transform being inversion of the three-dimensional orthogonal transform, to compose the main blocks which are divided into the first and the second blocks to reproduce the video signal.

5. A recording and reproducing apparatus comprising:

a divider to divide sequential pixels included in at least one pixel block of frame data of a video signal composed by sequential scanning into a plurality of main groups, the main groups being distributed into a first sub group of field data and a second sub group of field data so that odd-number groups of the main groups are sequentially distributed into the first sub group and even-number groups of the main groups are sequentially distributed into the second sub group;

a detector to detect correlation with respect to the pixels, in a horizontal direction and a vertical direction, of the main groups distributed into the first and the second sub groups separately;

a pixel arranger to arrange the pixels of each main group in a first predetermined arrangement order according to the detected correlation separately with respect to the first and the second sub groups of field data;

a frame generator, in response to the main groups in which the pixels are arranged, to generate a plurality of frames of pixels by interlaced scanning, separately with respect to the first and the second sub groups of field data;

a block generator to generate a plurality of first blocks of m pixels in a horizontal direction×m pixels in a vertical direction per frame, m being an integer, separately with respect to the first and the second sub groups;

an orthogonal transformer to selectively apply a first orthogonal transform to the first blocks and a second transform to second blocks of m pixels in the horizontal direction×m/2 pixels in the vertical direction obtained by means of the first blocks to obtain an addition of and a difference between the results of the second transform in each second block, separately with respect to the first and the second sub groups, and to output mode data indicating which of the first and the second orthogonal transform is applied;

a coder to encode the video signal with reference to the mode data, the blocks thereof being selectively applied with the first and the second transform, together with respect to the first and the second sub groups, to form a signal to be recorded;

a decoder to decode the formed signal to obtain a first data and a second data with respect to the first and the second sub groups, respectively;

an inverse-orthogonal transformer, with reference to the mode data, to selectively apply a first inverse-orthogonal transform and a second inverse-transform to the first data and the second data, separately, the first and the second inverse-orthogonal transform being inversion of the first and the second orthogonal transform, respectively;

a pixel rearranger to rearrange the pixels of the main groups in a rearrangement order which is inversion of the first arrangement order separately with respect to the first and the second sub groups;

a frame divider, in response to the main groups in which the pixels are rearranged, to generate a plurality of fields of pixels by interlaced scanning, separately with respect to the first and second sub groups; and a pixel composer to arrange the divided main groups in a predetermined second arrangement order to compose the sequential pixels included in the pixel block to reproduce the video signal.

6. A recording apparatus comprising:

a divider to divide sequential pixels included in at least one pixel block of frame data of a video signal having a luminance signal and a chrominance signal composed by sequential scanning into a plurality of main groups, the main groups being distributed into a first sub group of field data and a second sub group of field data so that odd-number groups of the main groups are sequentially distributed into the first sub group and even-number groups of the main groups are sequentially distributed into the second sub group;

a detector to detect correlation with respect to the pixels of the luminance signal, in a horizontal direction and a vertical direction, of the main groups distributed into the first and the second sub groups separately;

a pixel arranger to arrange the pixels of each main group of the luminance signal in a predetermined arrangement order according to the detected correlation separately with respect to the first and the second sub groups of field data;

a block transformer to transform a block of two pixels in a horizontal direction×two pixels in a vertical direction of each block of m pixels in the horizontal direction×m/2 pixels in the vertical direction of the arranged pixels of each main group of the luminance signal to a block of four pixels in the horizontal direction×one pixel in the vertical direction, m being an integer;

a frame generator, in response to the transformed main groups of the luminance signal and the main blocks of the chrominance signal, to generate a plurality of frames of pixels by interlaced scanning separately with respect to the first and second sub groups of field data, a ratio of the number of pixels of the chrominance signal to the luminance signal being 4:1 in the horizontal direction and 1:1 in the vertical direction;

a block generator to generate a plurality of first blocks of m pixels in the horizontal direction×m pixels in a vertical direction per frame separately with respect to the first and the second sub groups;

an orthogonal transformer to selectively apply a first orthogonal transform to the first blocks and a second transform to second blocks of m pixels in the horizontal direction×m/2 pixels in the vertical direction obtained by means of the first blocks to obtain an addition of and a difference between the results of the second transform in each second block separately with respect to the first and the second sub groups, and to output mode data indicating which of the first or the second orthogonal transform is applied; and a coder to encode the video signal with reference to the mode data, the blocks thereof being selectively applied with the first and the second transform, together with respect to the first and the second sub groups, to form a signal to be recorded.

7. A recording and reproducing apparatus comprising:

a divider to divide sequential pixels included in at least one pixel block of frame data of a video signal having a luminance signal and a chrominance signal composed by sequential scanning into a plurality of main groups, the main groups being distributed into a first sub group of field data and a second sub group of field data so that odd-number groups of the main groups are sequentially distributed into the first sub group and even-number groups of the main groups are sequentially distributed into the second sub group;

a detector to detect correlation with respect to the pixels of the luminance signal, in a horizontal direction and a vertical direction, of the main groups distributed into the first and the second sub groups separately;

a pixel arranger to arrange the pixels of each main group of the luminance signal in a predetermined arrangement order according to the detected correlation separately with respect to the first and the second sub groups of field data;

a block transformer to transform a block of two pixels in a horizontal direction×two pixels in a vertical direction of each block of m pixels in the horizontal direction×m/2 pixels in the vertical direction of the arranged pixels of each main group of the luminance signal to a block of four pixels in the horizontal direction×one pixel in the vertical direction, m being an integer;

a frame generator, in response to the transformed main groups of the luminance signal and the main blocks of the chrominance signal, to generate a plurality of frames of pixels by interlaced scanning separately with respect to the first and second sub groups of field data, a ratio of the number of pixels of the chrominance signal to the luminance signal being 4:1 in the horizontal direction and 1:1 in the vertical direction;

a block generator to generate a plurality of first blocks of m pixels in the horizontal direction×m pixels in a vertical direction per frame separately with respect to the first and the second sub groups;

an orthogonal transformer to selectively apply a first orthogonal transform to the first blocks and a second transform to second blocks of m pixels in the horizontal direction×m/2 pixels in the vertical direction obtained by means of the first blocks to obtain an addition of and a difference between the results of the second transform in each second block separately with respect to the first and the second sub groups, and to output mode data indicating which of the first or the second orthogonal transform is applied;

a coder to encode the video signal with reference to the mode data, the blocks thereof being selectively applied with the first and the second transform, together with respect to the first and the second sub groups, to form a signal to be recorded;

a decoder to decode the formed signal to obtain a first data and a second data with respect to the first and the second sub groups, respectively;

an inverse-orthogonal transformer, with reference to the mode data, to selectively apply a first inverse-orthogonal transform and a second inverse-transform to the first data and the second data, separately, the first and the second inverse-orthogonal transform being inversion of the first and the second orthogonal transform, respectively;

a pixel rearranger to rearrange the pixels of the main groups in a rearrangement order which is inversion of the first arrangement order separately with respect to the first and the second sub groups;

a frame divider, in response to the main groups in which the pixels are rearranged, to generate a plurality of pixels of field data of a luminance and a chrominance signal by interlaced scanning, separately with respect to the first and second sub groups;

an inverse block transformer to inversely transform the generated pixels of field data of the luminance signal, the inverse-block transform being inversion of the block transform by the block transformer; and a pixel composer to arrange the inversely transformed pixels of field data of the luminance signal and the generated pixels of field data of the chrominance signal separately in a predetermined second arrangement order to compose the sequential pixels included in the pixel block to reproduce the video signal.

* * * * *